(12) United States Patent
de Freitas Silvestre

(10) Patent No.: US 9,441,367 B2
(45) Date of Patent: *Sep. 13, 2016

(54) SUPPORTING ELEMENT FOR PIPES IN BUILDINGS AND APPLICATION METHOD OF A PIPE SUPPORTING ELEMENT IN A FLAGSTONE

(71) Applicant: Wladimir de Freitas Silvestre, Carapicuiba (BR)

(72) Inventor: Wladimir de Freitas Silvestre, Carapicuiba (BR)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,899

(22) Filed: Dec. 1, 2015

(65) Prior Publication Data

US 2016/0090738 A1    Mar. 31, 2016

Related U.S. Application Data

(63) Continuation-in-part of application No. 14/353,603, filed as application No. PCT/BR2012/000417 on Oct. 29, 2012, now Pat. No. 9,228,346.

(30) Foreign Application Priority Data

Oct. 28, 2011 (BR) ........................ 1106760

(51) Int. Cl.
| | |
|---|---|
| E04C 2/52 | (2006.01) |
| E04B 5/48 | (2006.01) |
| F16L 5/14 | (2006.01) |
| H02G 3/22 | (2006.01) |
| E04B 5/36 | (2006.01) |
| E04G 15/00 | (2006.01) |
| F16L 5/10 | (2006.01) |

(52) U.S. Cl.
CPC . *E04B 5/48* (2013.01); *E04B 5/36* (2013.01); *E04G 15/00* (2013.01); *F16L 5/10* (2013.01); *F16L 5/14* (2013.01); *H02G 3/22* (2013.01)

(58) Field of Classification Search
CPC ............. E04B 5/48; F16L 3/222; F16L 3/00; F16L 5/14; E04G 15/061; H02G 3/22
USPC ............................................. 52/220.1, 220.8
See application file for complete search history.

(56) References Cited

U.S. PATENT DOCUMENTS

| | | |
|---|---|---|
| 2,694,847 A | 11/1954 | Christiansen |
| 4,619,087 A | 10/1986 | Harbeke |
| 4,804,160 A | 2/1989 | Harbeke |
| 6,348,657 B1 | 2/2002 | Haslock et al. |
| 2001/0037835 A1 | 11/2001 | Shimizu |
| 2006/0096195 A1 | 5/2006 | Zierer |
| 2006/0265980 A1 | 11/2006 | Vaughan |
| 2006/0272243 A1 | 12/2006 | Carew et al. |
| 2010/0148018 A1 | 6/2010 | Schoenau et al. |
| 2011/0088917 A1 | 4/2011 | Lee |
| 2011/0186349 A1 | 8/2011 | Troetzschel et al. |
| 2012/0032036 A1 | 2/2012 | Andersson et al. |
| 2012/0097405 A1 | 4/2012 | Cordts et al. |
| 2014/0042712 A1 | 2/2014 | O'Connor et al. |
| 2014/0260013 A1 | 9/2014 | de Freitas Silvestre |

*Primary Examiner* — Joshua J Michener
*Assistant Examiner* — Keith Minter
(74) *Attorney, Agent, or Firm* — Alston & Bird LLP

(57) ABSTRACT

This relates to a pipe supporting element (1) used to contain a pipe (15) that is used in buildings for hydraulic, electrical and other pipes. In one preferred arrangement, the aforementioned pipe supporting element comprises polyethylene foam, is as thick as a partition (wall or paving slab), has at least two anchoring points located on the side faces (3) thereof, and includes at least one through hole (2) between a first face (1) and a second face (2).

25 Claims, 16 Drawing Sheets

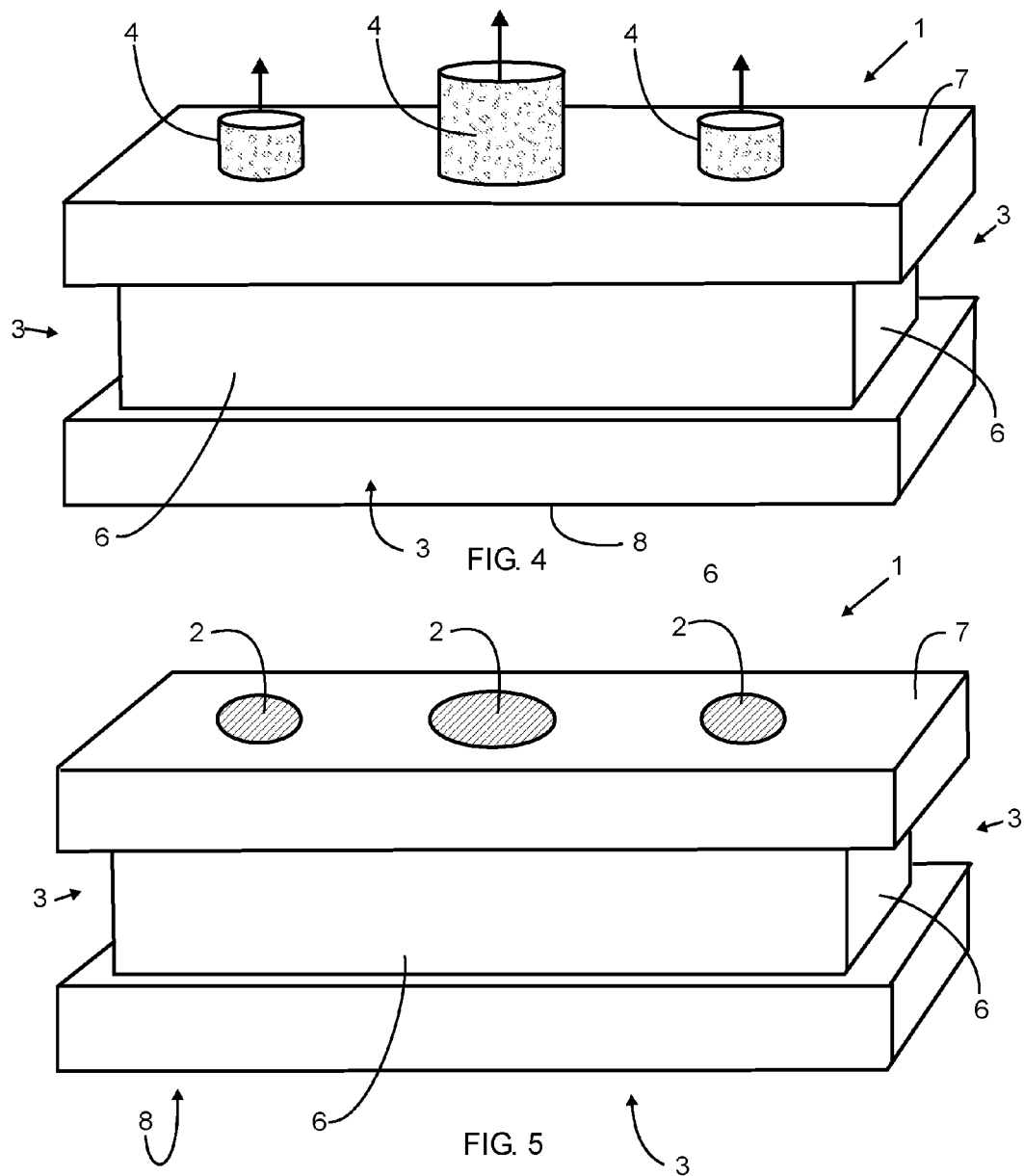

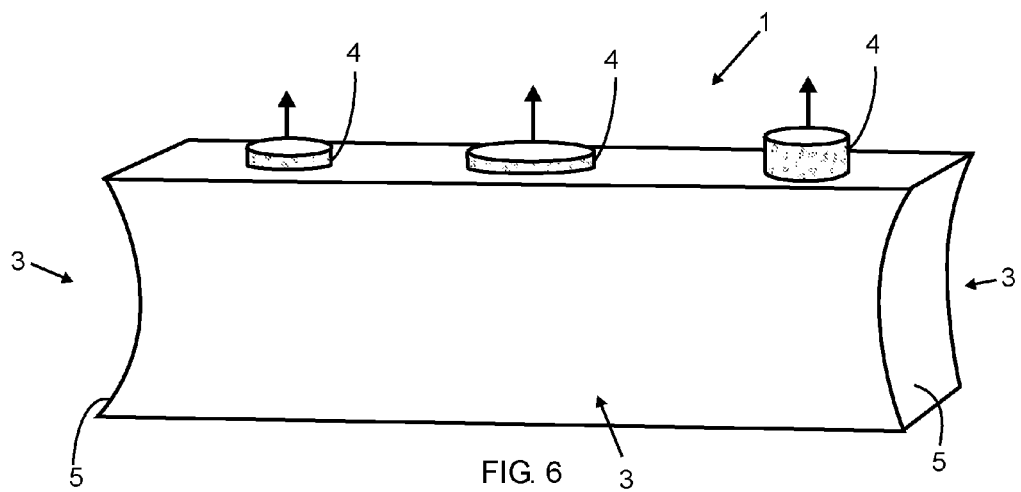
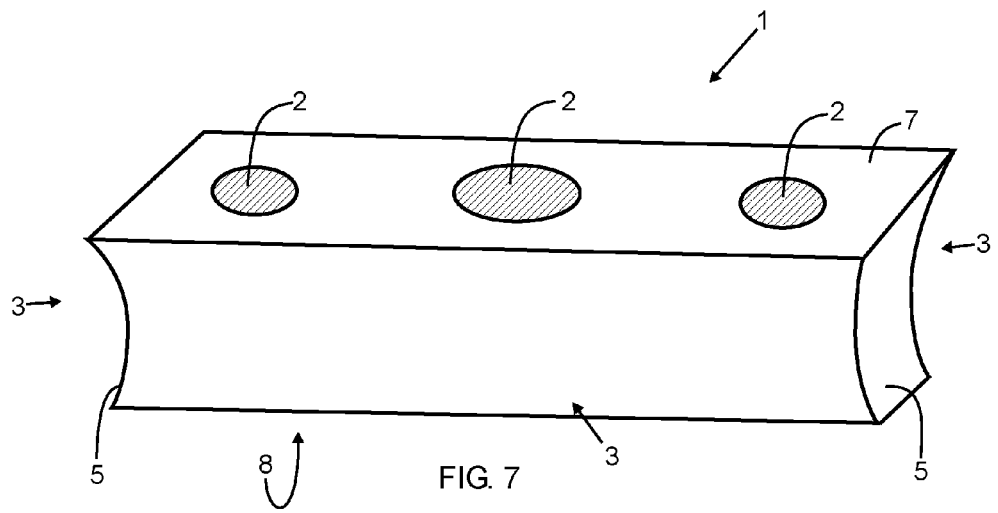

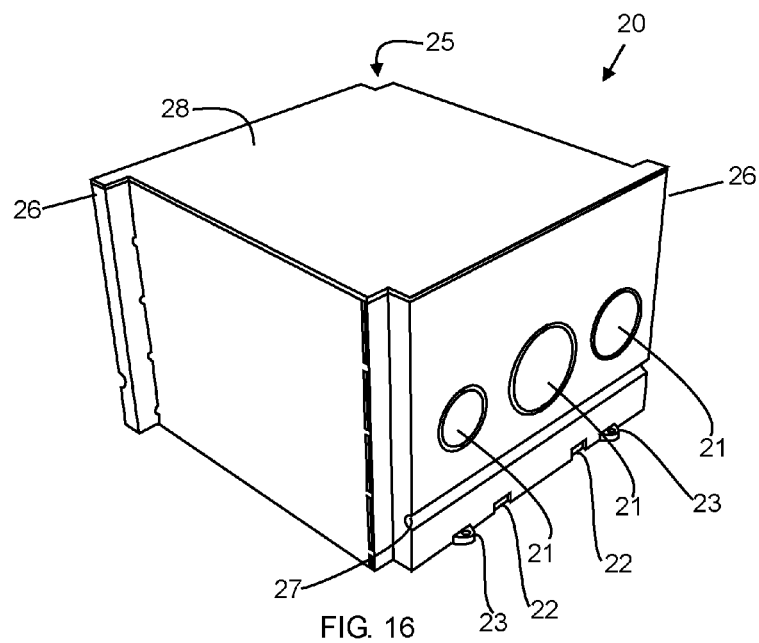
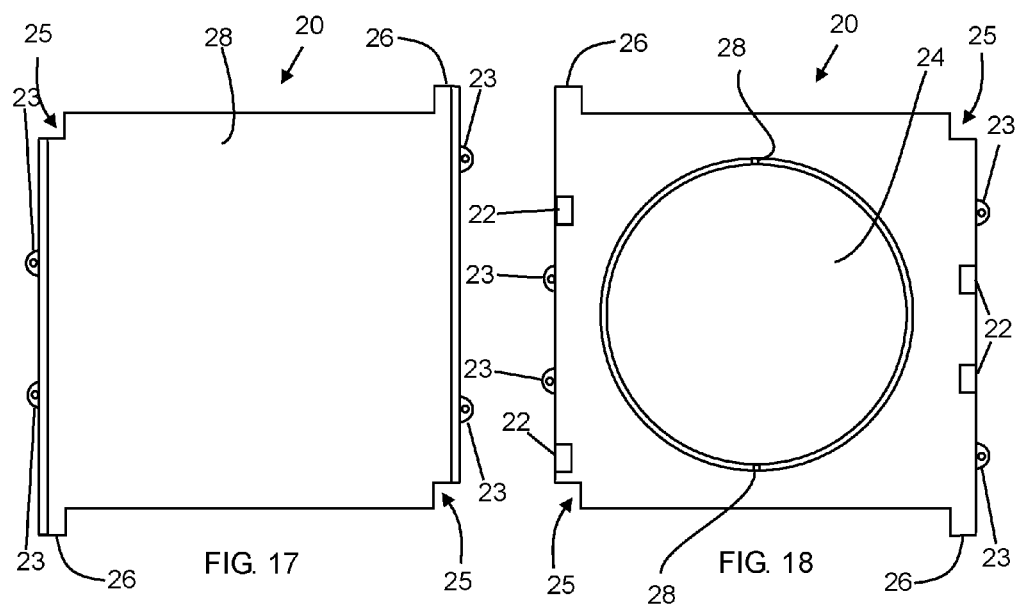

SUPPORTING ELEMENT FOR PIPES IN BUILDINGS AND APPLICATION METHOD OF A PIPE SUPPORTING ELEMENT IN A FLAGSTONE

CROSS-REFERENCE TO RELATED APPLICATIONS

This application claims priority to and the benefit of U.S. patent application Ser. No. 14/353,603, filed Apr. 23, 2014, which United States Patent Application is a National Stage Application, filed under 35 U.S.C. §371, of International Application No. PCT/BR2012/000417, filed Oct. 29, 2012, which International Application claims priority to and the benefit of Brazilian Application No. PI1106760-8, filed Oct. 28, 2011; the contents of all of which are hereby incorporated by reference in their entirety.

BACKGROUND

1. Technical Field

The present invention relates to a tubing support for application in buildings, application on dividers such as partition walls and slabs, configured to accommodate water tubing, electricity and gas lines in a stable position on divider.

2. Related Art

Upon carrying out works in the field of civil construction, there are steps that consist in installing tubing pieces, which are designed to communicate various parts of a building.

Such tubing may be hydraulic (water and sewage); electric, which houses electric cables; or still gas tubing, which distribute gas for use on stoves, boilers and other heating systems.

Such tubing can be installed in various ways. One of them consists in perforating already-built dividers (i.e. walls and slabs), laying tubing and covering with concrete the spaces that had been opened for accommodating such tubing.

Another way to install tubing, for instance, through shaft or vertical galleries, is achieved above all by passing the tubing between the slabs of a building. It is described in detail hereinafter.

During the process of pouring concrete of a slab, after laying the iron bars and before pouring the concrete onto the slab mold, a few wooden crates are fixed onto the mold floor at the places where the hydraulic tubing will pass in the future. After the concrete have cured, the crates are removed, leaving rectangular openings in the slab, allowing communication between the floors.

In the rectangular openings one positions tubing (such as hydraulic, electric and system tubing, among others). After positioning the tubing, the last step of this process consists in closing with concrete the whole volume existing between the tubing and the rectangular opening. This, in turn, is carried out by securing wooden sheets on the lower slab face, and pouring concrete into the empty space between the tubing and the rectangular opening through the upper slab face.

It should be noted that this process (just as the first one, described in the beginning of this specification), is time consuming and expensive. It should be noted that, besides consuming time and money, this process may bring other drawbacks, as will be disclosed hereinafter.

The wooden crate employed to form the rectangular spacing is generally fixed with nails onto the slab-mold floor and, in relatively high buildings, the slab mold is impaired by frequent fixation and removal of the wood crates.

Another drawback is the lack of dimensional precision in positioning the tubing, which is inherent in employing this process. It is known that this process may entail variation in the positioning of the tubes with respect to the slab, which, as a result, may alter the positioning of the tubing on a determined building floor.

A third problem, besides the high cost and long time for carrying out this process, is that the concrete used for filling the space between the slab and the tubing, after having hardened in its curing process, leads to sound vibrations and thermal energy from the tubing to the slab and to the environment adjacent the slab. Additionally, such prior-art procedures generate debris and slowness in developing the work due to the need for a complementary step for concreting (see FIG. 1).

Therefore, one concludes that the technical solutions employed at present in tubing installations—perforation of existing dividers and the process that makes use of fixing wooden boxes onto the slab molds before concreting=cause great drawbacks before, during and after the carrying-out thereof.

BRIEF SUMMARY

The present invention has the objective of achieving a prefabricated tubing support, which reduces the costs and time for carrying out the installation of tubing in building construction works.

The present invention has also the objective of achieving a tubing support configured to provide accommodation for hydraulic, electric or other tugging of a building installation.

The present invention further has the objective of providing a tubing support that is configured for insulating a slab from sound and thermal energy from the tubing.

The present invention has also the objective of providing a process for installing tubing that is capable of aiding in standardization of the positioning of tubes inside a construction, thus preventing failures due to inaccuracy in positioning the tubing.

Finally, the present invention further has the objective of providing a process of installing tubing that will not damage the slab mold with the successive fixation and removal of wooden boxes.

The objectives of the present invention are achieved by means of a building tubing support comprising a first face and a second face that are substantially flat and arranged in opposition, at a distance capable of defining a height, configuring the tubing support with a polyhedral geometric form or rounded-body shape, the tubing-support height defining at least one side face comprising at least two anchorage points arranged in opposition and positioned between the first face and the second face; the tubing support further comprising at least one through-bore that communicates the first face and the second face and enables accommodation of a tube inside it; the tubing support being configured to be arranged between two faces of a divider, facing them and enabling at least one tube to pass through the divider through at least one through-bore.

The objectives of the present invention are also achieved by means of a method of applying a tubing support to a slab, which comprises the following steps:

Step 1: fixing the tubing support at the desired place;
Step 2: concreting the slab;
Step 3: removing the fill foams from inside the through-bores;
Step 4: positioning the tubes inside the through-bores.

The objectives of the present invention are also achieved by means of a tubing support that comprises a first face and a second face that are substantially flat and arranged in opposition, at a distance capable of defining a height configuring the tubing support with a polyhedral form or rounded-body shape, the tubing-support height defining at least one side face, the tubing support comprising at least one permanent layer and one removable layer, and the tubing support being configured to be arranged between two divider faces, facing them, enabling at least one tube to pass through the divider through the at least one through-bore formed in the permanent layer after removal of the removable layer.

Finally, the objectives of the present invention are alto achieved by means of a method of applying a tubing support onto a slab, which comprises the following steps:

Step 1: fixing the tubing support at the desired place;
Step 2: concreting the slab;
Step 3: removing the removable layer;
Step 4: perforating a bore in the permanent layer;
Step 5: positioning the tube in the bore made in step 4;
Step 6: applying an additional concrete layer onto the permanent layer, this additional concrete layer being configured to fix the tube at a stable position.

According to various embodiments there is provided a building tubing support. The building tubing support comprises: a first removable layer having a first thickness, a first length, and a substantially flat first removable face lying in a first face plane and oriented in a first direction; a second removable layer having a second thickness, a second length, and a substantially flat second removable face lying in a second face plane and oriented in a second direction, the second length being the same as the first length, the second face plane being parallel and spaced apart from the first face plane, the second direction being oppositely oriented relative to the first direction; a permanent layer having a third thickness, a third length, and opposing substantially flat first and second permanent faces lying in respective third and fourth face planes, the third length being greater than both the first and the second lengths, the third and fourth face planes being parallel and spaced apart relative to one another and the first and second planes, the permanent layer being positioned intermediate the first and second removable layers; and at least two opposing side surfaces, each of the at least two opposing side surfaces having a first portion defined by the first thickness of the first removable layer, a second portion defined by the second thickness of the second removable layer, and a third portion defined by the third thickness of the permanent layer, the third portion being positioned intermediate the first and second portions, wherein: the first, second, and third thicknesses of the removable and permanent layers collectively define a height of the tubing support, the height of the tubing support being substantially equivalent to a height of at least two faces of a divider between which the tubing support is positioned; the first and second portions of each of the at least two opposing side surfaces are oriented in respective side surface planes, each of the side surface planes being perpendicular to the first, second, third, and fourth face planes; and the third portion of each of the at least two opposing side surfaces is oriented in a respective lateral projection plane, the lateral projection plane being perpendicular to the first, second, third, and fourth face planes, the lateral projection plane being further spaced apart from and parallel to the side surface plane of the first and second portions of each of the at least two opposing side surfaces, such that the third portion of each of the at least two opposing side surfaces defines a lateral projection of the tubing support extending outwardly and perpendicularly from the first and second portions of the at least two opposing side surfaces.

According to various embodiments there is provided a method of applying a tubing support onto a slab, the method comprising the steps of positioning the tubing support at a desired location; applying an initial concrete layer around the tubing support, the initial concrete layer forming the slab such that a substantially flat surface of the slab is parallel and aligned with the substantially flat first face of the tubing support; removing at least the first removable layer from the tubing support; after removing at least the first removable layer, perforating at least the permanent layer so as to form a through-bore therein, the through-bore being formed perpendicular relative to and passing through a portion of the substantially flat second permanent face of the permanent layer; positioning at least one tube in the formed through-bore; and applying an additional concrete layer at least on top of the permanent layer and around the at least one tube so as to fix the at least one tube in a stable position, the additional concrete layer having a thickness such that a substantially flat surface of the additional concrete layer aligns with the substantially flat surface of the slab. The method is implemented with a tubing support comprising: a first removable layer having a first thickness, a first length, and a substantially flat first removable face lying in a first face plane and oriented in a first direction; a second removable layer having a second thickness, a second length, and a substantially flat second removable face lying in a second face plane and oriented in a second direction, the second length being the same as the first length, the second face plane being parallel and spaced apart from the first face plane, the second direction being oppositely oriented relative to the first direction; a permanent layer having a third thickness, a third length, and opposing substantially flat first and second permanent faces lying in respective third and fourth face planes, the third length being greater than both the first and the second lengths, the third and fourth face planes being parallel and spaced apart relative to one another and the first and second planes, the permanent layer being positioned intermediate the first and second removable layers; and at least two opposing side surfaces, each of the at least two opposing side surfaces having a first portion defined by the first thickness of the first removable layer, a second portion defined by the second thickness of the second removable layer, and a third portion defined by the third thickness of the permanent layer, the third portion being positioned intermediate the first and second portions, wherein the first, second, and third thicknesses of the removable and permanent layers collectively define a height of the tubing support, the height of the tubing support being substantially equivalent to a height of at least two faces of a divider between which the tubing support is positioned; the first and second portions of each of the at least two opposing side surfaces are oriented in respective side surface planes, each of the side surface planes being perpendicular to the first, second, third, and fourth face planes; and the third portion of each of the at least two opposing side surfaces is oriented in a respective lateral projection plane, the lateral projection plane being perpendicular to the first, second, third, and fourth face planes, the lateral projection plane being further spaced apart from and parallel to the side surface plane of the first and second portions of each of the at least two opposing side surfaces, such that the third portion of each of the at least two opposing side surfaces defines a lateral projection of the tubing support extending outwardly and perpendicularly from the first and second portions of the at least two opposing side surfaces.

According to various embodiments there is provided a modular assembly comprising two or more tubing supports, each tubing support comprising: a first removable layer having a first thickness, a first length, and a substantially flat first removable face lying in a first face plane and oriented in a first direction; a second removable layer having a second thickness, a second length, and a substantially flat second removable face lying in a second face plane and oriented in a second direction, the second length being the same as the first length, the second face plane being parallel and spaced apart from the first face plane, the second direction being oppositely oriented relative to the first direction; a permanent layer having a third thickness, a third length, and opposing substantially flat first and second permanent faces lying in respective third and fourth face planes, the third length being greater than both the first and the second lengths, the third and fourth face planes being parallel and spaced apart relative to one another and the first and second planes, the permanent layer being positioned intermediate the first and second removable layers; and at least two opposing side surfaces, each of the two opposing side surfaces having a first portion defined by the first thickness of the first removable layer, a second portion defined by the second thickness of the second removable layer, and a third portion defined by the third thickness of the permanent layer, the third portion being positioned intermediate the first and second portions, wherein the first, second, and third thicknesses of the removable and permanent layers collectively define a height of the tubing support, the height of the tubing support being substantially equivalent to a height of at least two faces of a divider between which the tubing support is positioned; the first and second portions of each of the two opposing side surfaces are oriented in respective side surface planes, each of the side surface planes being perpendicular to the first, second, third, and fourth face planes; and the third portion of each of the two opposing side surfaces is oriented in a respective lateral projection plane, the lateral projection plane being perpendicular to the first, second, third, and fourth face planes, the lateral projection plane being further spaced apart from and parallel to the side surface plane of the first and second portions of each of the two opposing side surfaces, such that the third portion of each of the two opposing side surfaces defines a lateral projection of the tubing support extending outwardly and perpendicularly from the first and second portions of the at least two opposing side surfaces; wherein the at least two opposing side surfaces consists of a first set of two opposing side surfaces; the tubing support further comprises a second set of two opposing side surfaces, the second set of two opposing side surfaces being defined by the first, second, and third portions; the first, second, and third portions of each of the second set of two opposing side surfaces are oriented in respective side surface planes, each of the respective side surface planes being perpendicular to the first, second, third, and fourth face planes, such that the third portion of the second set of two opposing side surfaces is coplanar with the first and second portions; and the modular assembly is formed by positioning respective ones of the two or more tubing supports adjacent one another, such that the second set of two opposing side surfaces of each of the two or more tubing supports are in direct contact with one another, such that the lateral projections defined by the third portion of the first set of opposing side surfaces of each of the two or more tubing supports creates a continuous surface for embedding within poured concrete in a manner that stabilizes from tubing support against any movement thereof.

According to various embodiments there is provided a building tubing support comprising: a removable layer having a first thickness and a substantially flat first face oriented in a first direction; a permanent layer having a second thickness and a substantially flat second face oriented in a second direction, the permanent layer being positioned adjacent the removable layer and formed from a different material different than the removable layer, the second direction being opposite the first direction; and at least one side surface, the at least one side surface having a first portion being defined by the first thickness of the removable layer and a second portion being defined by the second thickness of the permanent layer; wherein: the first portion of the at least one side surface has a planar profile; the second portion of the at least one side surface has a non-planar profile; the first and the second portions of the at least one side surface are configured to together correspond with at least two faces of a divider between which the tubing support is positioned; and the first and second thicknesses of the removable and permanent layers together define a height of the tubing support, the height of the tubing support being substantially equivalent to a height of the divider.

Herein and throughout, where an exemplary embodiment is described or an advantage thereof is identified, such are considered and intended as exemplary and non-limiting in nature, so as to not otherwise limit or constrain the scope and nature of the inventive concepts disclosed.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings:

FIG. 4 is a perspective top view of a second exemplary embodiment of the present invention;

FIG. 5 is a perspective top view of a second exemplary embodiment of the present invention disclosing the tubing support after removal of the fill foams;

FIG. 6 is a perspective top view of a third exemplary embodiment of the present invention;

FIG. 7 is a perspective top view of a third exemplary embodiment of the present invention after removal of the fill foams;

FIG. 16 is a perspective top view of the present invention of an alternative embodiment called PVC shaft;

FIG. 17 is a top view of the present invention in the alternative PVC shaft embodiment;

FIG. 18 is a lower view of the present invention in the alternative PVC shaft embodiment;

Figure 21:
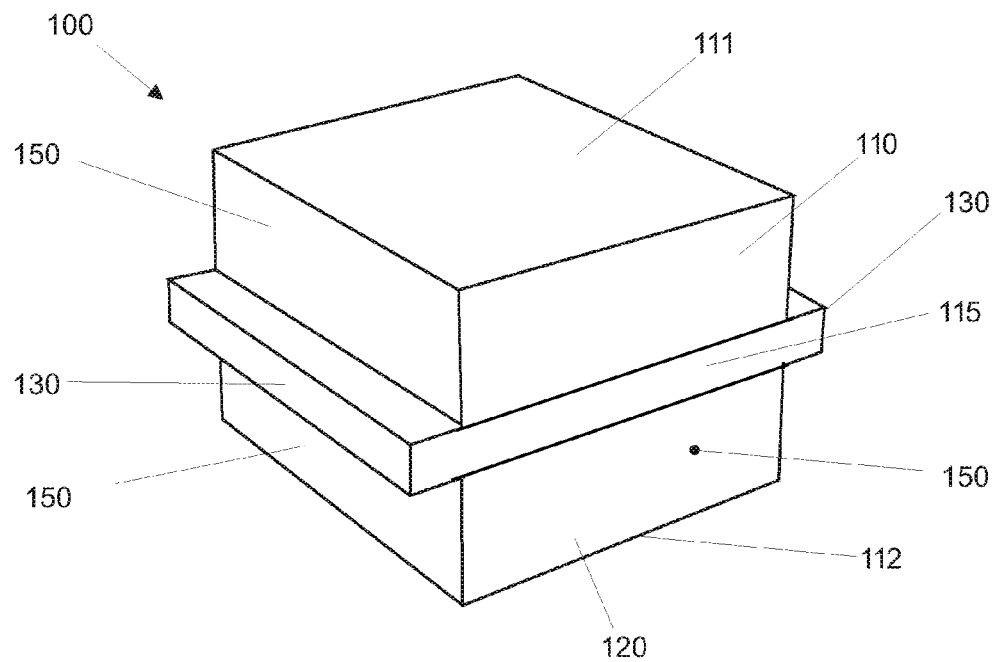
FIG. 21 is a perspective top view of a tenth exemplary embodiment of the present invention.
Figure 24A:
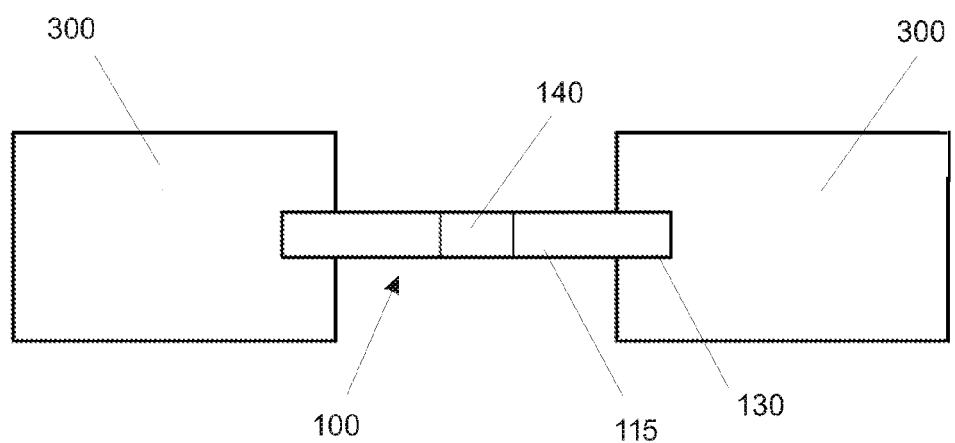
Figure 24B:
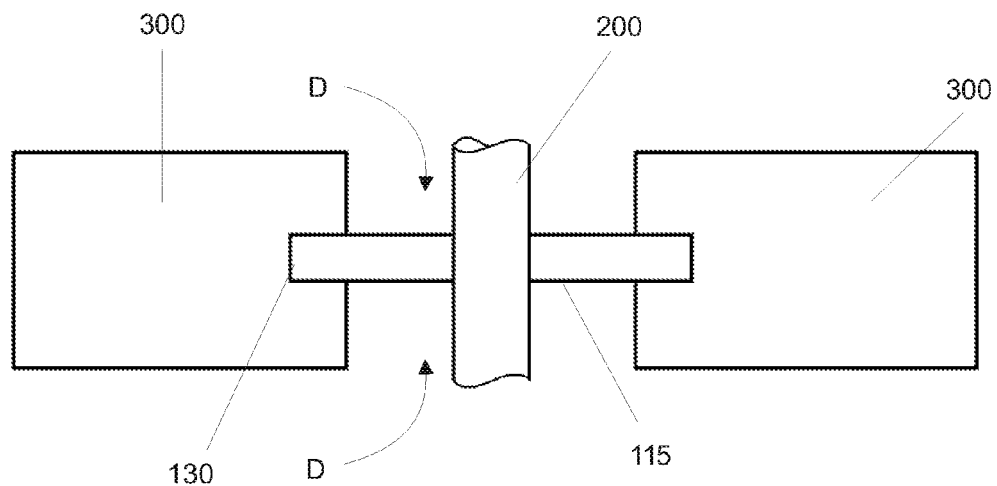
Figure 24C:
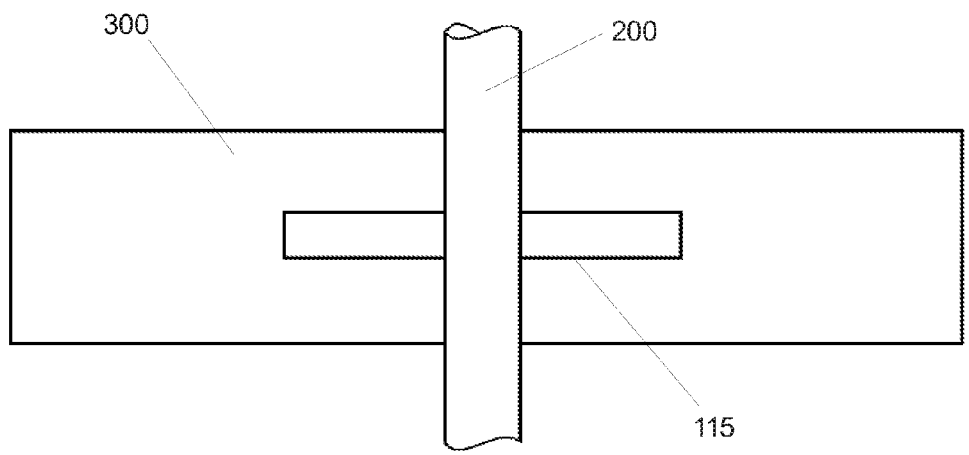
Figure 25:
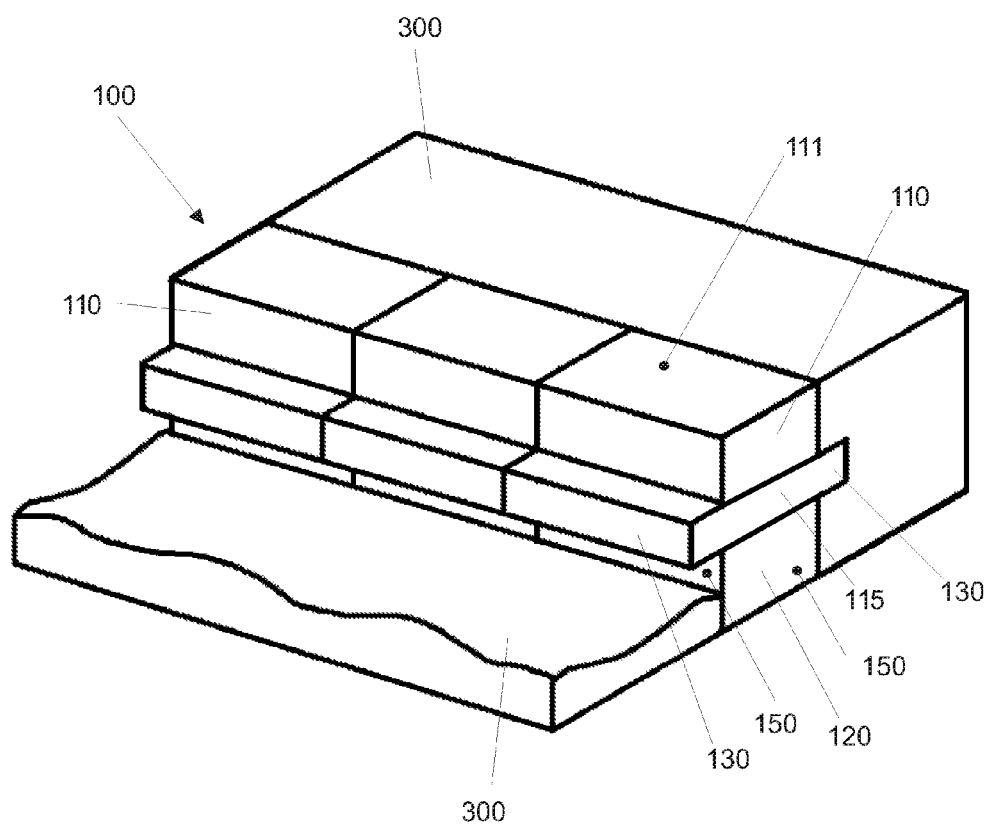
Figure 26:
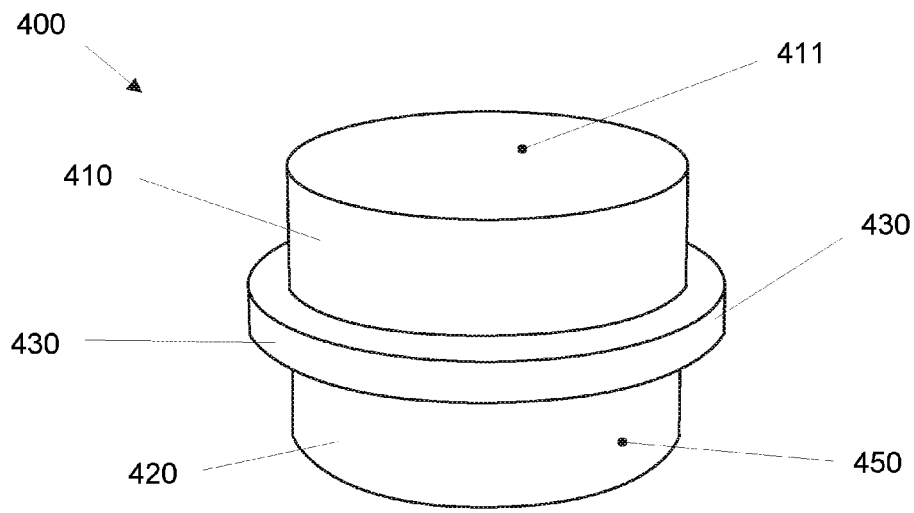
Figure 27:
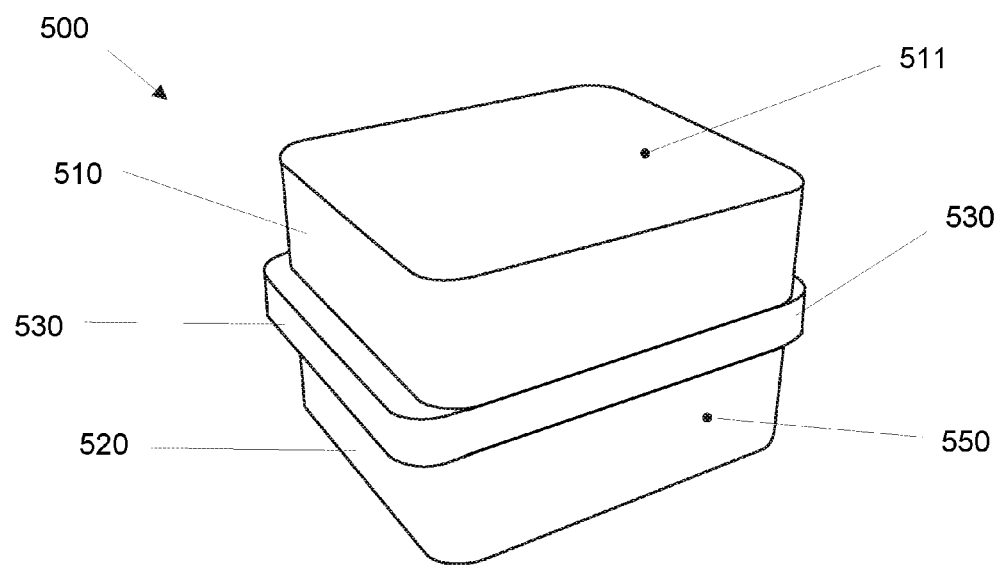

FIG. 24A is a front view of the tenth exemplary embodiment of FIG. 21, with removable layers 110/120 removed relative to the concrete divider 300 and a through-bore 140 provided in a permanent layer 130;

FIG. 24B is a front view of the tenth exemplary embodiment of FIG. 21, with a tube 200 passing through the through-bore 140 of the permanent layer 130;

FIG. 24C is a further front view of the tenth exemplary embodiment of FIG. 21, illustrating empty space from removal of layers 110/120 filled with concrete surrounding and thus securing the tube 200;

FIG. 25 is a perspective top view of an eleventh exemplary embodiment, illustrating the tubing support of FIG. 21 as a modular solution;

FIG. 26 is a perspective top view of a twelfth exemplary embodiment of the present invention; and FIG. 27 is a perspective top view of a thirteenth exemplary embodiment of the present invention.

DETAILED DESCRIPTION OF VARIOUS EMBODIMENTS

Various example embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The tubing support 1 of the present invention, in an exemplary embodiment (see FIG. 2), consists of a substantially polyhedral or rounded-body object (for example, a parallelepiped), constituted by a synthetic foam, which is provided with at least two anchorage points which man be provided of at least one through-bore 2 for accommodating a tube 15.

The tubing support 1 was developed for being used during the concreting step or masonry step of a divider (by a "divider" one means any elements used for dividing rooms, and other environments in a building, such as walls and slabs). In this regard, one should understand that the tubing support 1 can be applied in accommodating any type of tubing, as for instance, hydraulic columns, toilet-bowl tubing, drain, to mention only a few applications. During the construction of a slab, for instance, the tubing support 1 should be fixed to the mold or to the iron bars 16 before the step of pouring the slab, that is, the step that consists in pouring liquefied concrete onto the mold (see FIG. 8).

After the concrete has cured, the tubing support 1—which has thickness similar to that of the slab where it should be applied—remains at the place where it was initially fixed, since its anchorage points keeps it associated to the slab concrete.

Figure 3:
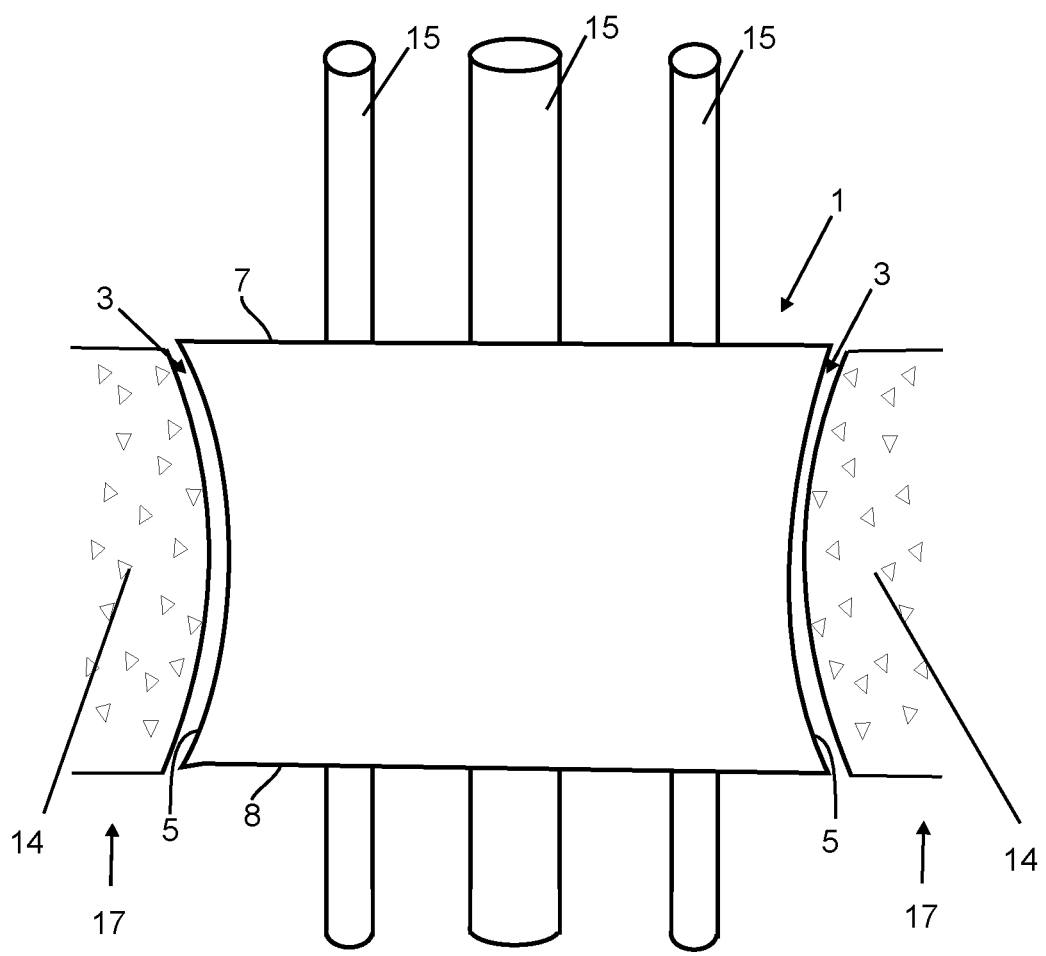
FIG. 3 is a perspective front view of a tubing support of the present invention under application onto a concrete divider.
Figure 9:
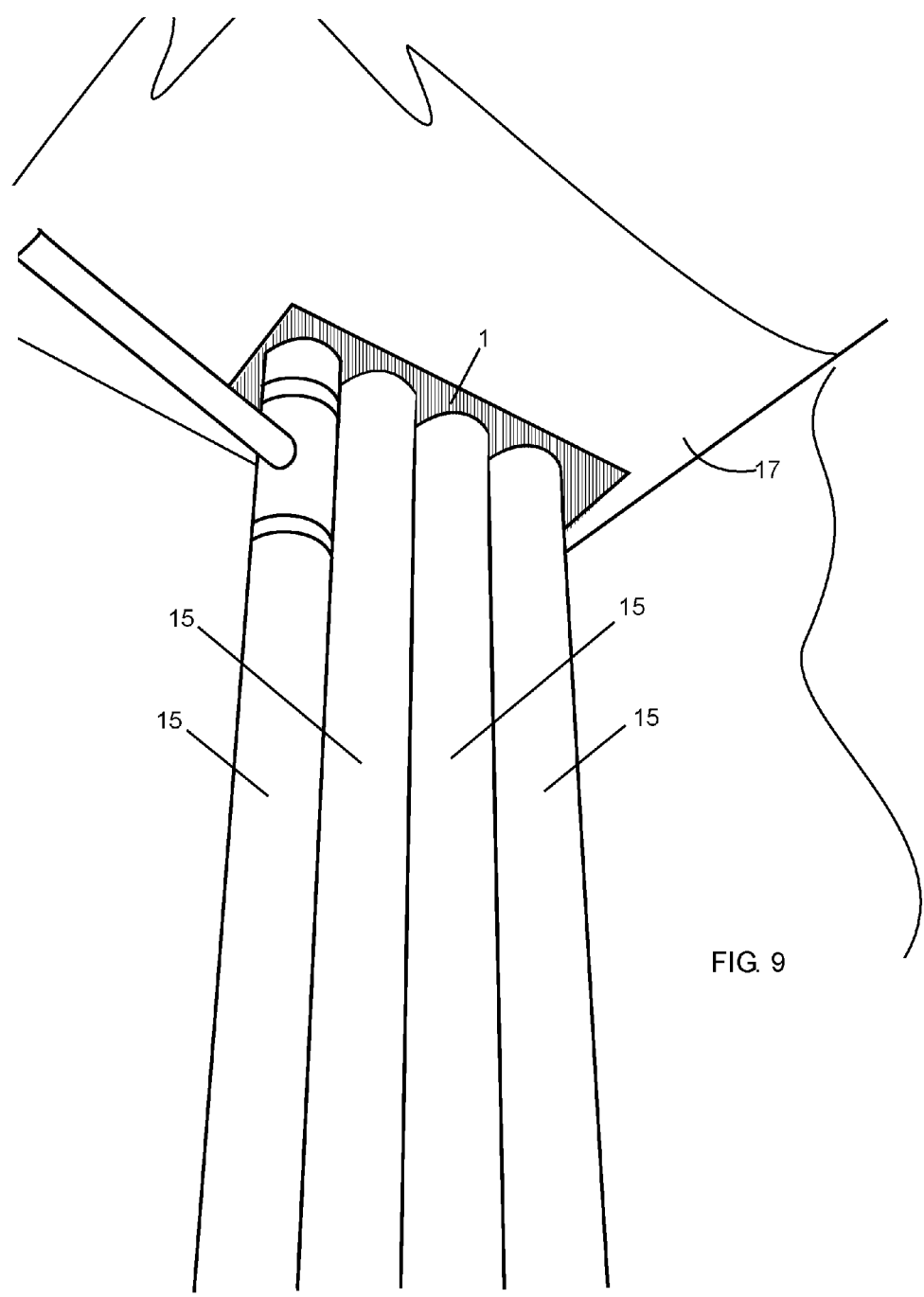
FIG. 9 is a perspective lower view of the tubing support after application thereof onto a slab.

It should be noted that, in the embodiments where the tubing support 1 comprises at least one through-bore 2, which passes through the tubing support transversely from the first face 7 to a second face 8, the tubing support 1 is capable of easily providing accommodation for the tubing of a building after the concrete-curing time of a slab has passed (see FIGS. 3 and 9). In other embodiments, the through-bore 2 may not be a prefabricated item of the tubing support 1. In other words, the through-bores 2 of the tubing support 1 could be made after the slab concreting step, by means of any cutting tool or by pressing the tube 15 onto the first face 7 after concreting.

For a better understanding of the invention, the process of applying the tubing support 1 in a preferred embodiment comprises the following steps:

Step 1: fixing the tubing support 1 onto the desired place;
Step 2: concreting the slab (not shown in the figures);
Step 3: positioning the tubes 15 inside the through-bores 2.

It should be noted that, in general, the main characteristics of this invention are disclosed in the above lines. However, the present invention may comprise various embodiments and constructive details that are part of the same inventive concept, but are capable of imparting different qualities to the tubing support 1.

As disclosed before, the tubing support 1 is preferably provided with an orthogonal outer profile, that is, preferably a tubing support 1 assumes a parallelepiped shape provided with anchorage points on its side faces 3 and at least one through-bore 2 that passes through the tubing support 1 from a first face 7 to a second face 8. However, nothing prevents the tubing support 1 from being provided with a cylindrical, oval shape or as a prism with orthogonal cross-section, for instance, as long as they define two parallel plans, one of these planes corresponding to its first face 7 and the other plane corresponding to the second face 8.

It should be noted that the first and second faces 7, 8 should define, preferably but not compulsorily, substantially flat and parallel-to-each other surfaces or, in other words, they should define parallel plans. This is because each of these faces 7, 8 should be arranged on the same plane comprised by the two faces of a divider (that is, upper and lower faces of a slab or front and back faces of a wall).

With regard to the anchorage of the tubing support 1, it should be noted that it may assume various different forms, elements and arrangements. This anchorage may be provided by pins or protrusions that emerge from the side faces 3 of the tubing support 1. It may be provided with side, recesses, tears or bores distributed over the side faces 3 or still with a concave 5 or convex (not shown in the figures) profile.

The figures of this specification show an anchorage that has a geometry of longitudinal tears 6 (FIGS. 2, 4, 5, 10 and 11) and an anchorage that consists of a concave profile 5 defined on the side faces 3 of the tubing support 1 (FIGS. 6, 7, 10 and 13).

It should be noted that, with regard to the anchorages, one of the most efficient constructive embodiments is achieved by the anchorage with a concave profile 5, represented in detail in FIG. 3. This anchorage with a concave profile 5 enables one to accommodate more easily the concrete gravel 14 in its internal spacing than an anchorage that makes use of a longitudinal tear 6, since the longitudinal tear 6 may not be totally filled with concrete due to the presence of gravel bigger than the tear, which would make it impossible to accommodate the concrete correctly into the tear 6, thus generating empty spaces.

Therefore, the anchorage may be carried out in a number of different ways, and the only common denominator is that the anchorage elements should be arranged between the first face 7 and the second face 8 of the tubing support 1.

When it comes to the arrangement and characteristic of the through-bores 2 in the tubing support 1, it should be noted that the latter may assume numberless geometries, cross-sections, direction and distribution (in both number and space).

Figure 1:
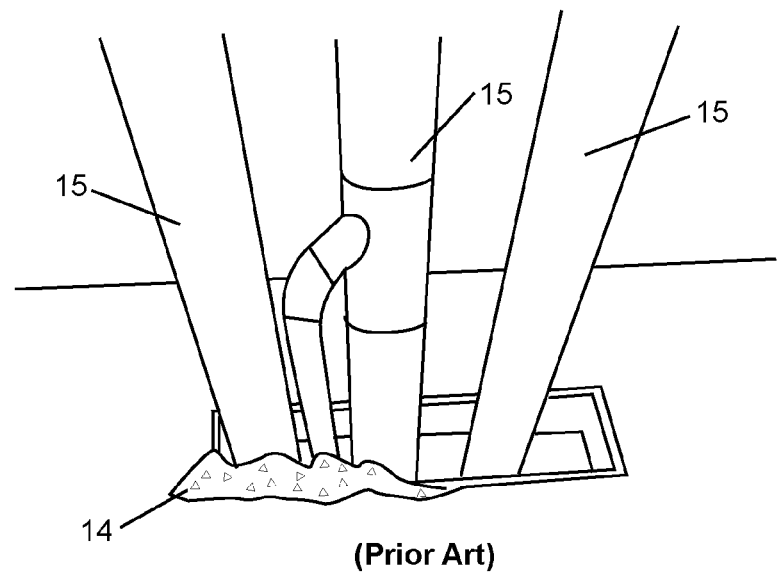
FIG. 1 is a perspective top view of a process of installing hydraulic tubing on prior-art concrete slabs.
Figure 2:
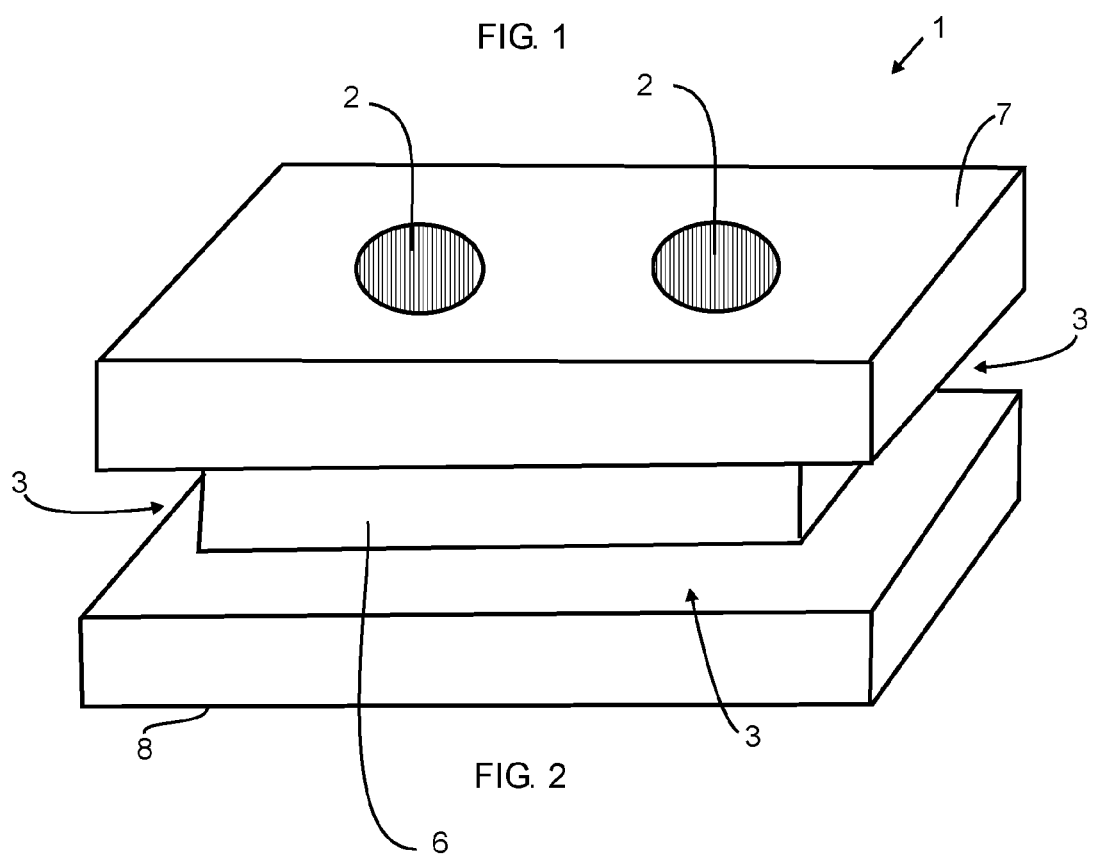
FIG. 2 is a perspective top view of a first exemplary embodiment of the tubing support of the present invention.
Figure 8:
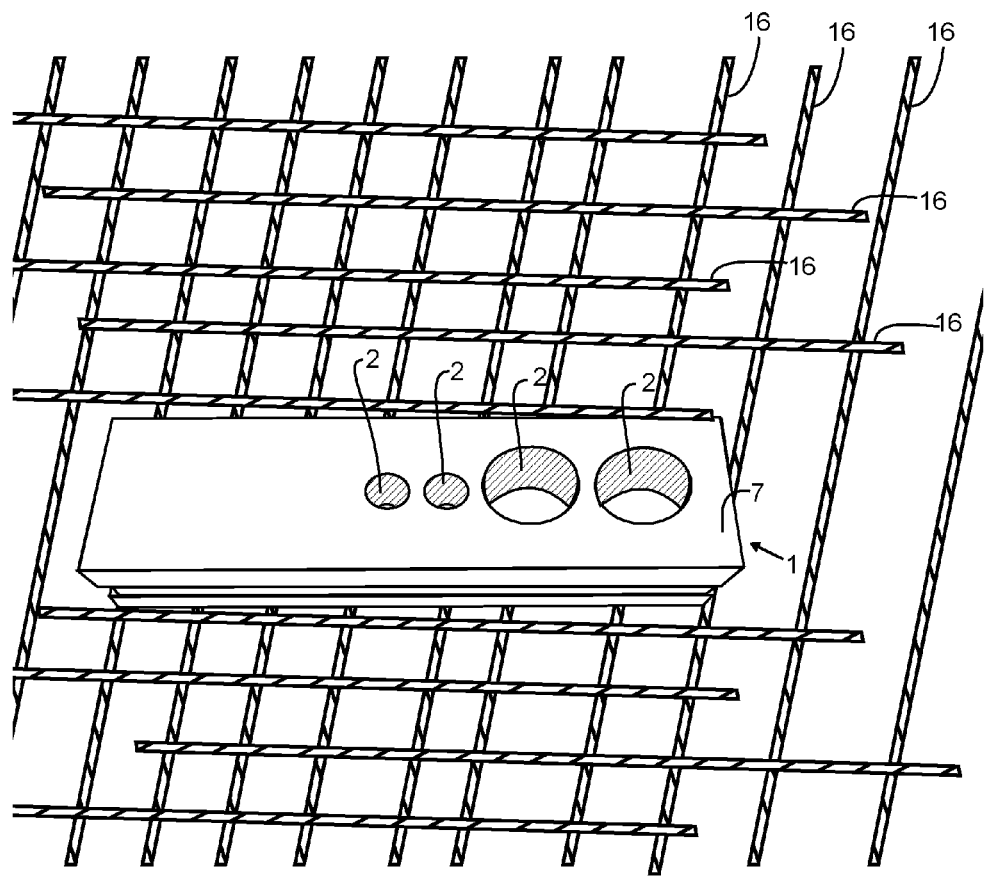
FIG. 8 is a top view of the first step of the method of applying a tubing support onto a slab.

In FIG. 2 the tubing support 1 comprises two through-bores 2 provided with the same inner diameter, arranged symmetrically with respect to the first face 7; and positioned orthogonally with respect to the first and second faces 7, 8. In FIGS. 5 and 7, the tubing support 2 comprises three through-bores 2 of different diameters and symmetrically arranged; and in FIG. 8 are discloses four through-bores of different diameters, arranged at the right end of the tubing support 1. Thus, it is clear that one can achieve any embodiment according to the needs of the design.

It should be further noted that the through-bores 2 may be arranged obliquely with respect to the plane of the first and second face 7, 8, and this arrangement might be useful for applying the tubing support 1 to inclined walls that require horizontally oriented tubing, for instance. A tubing support 1 may further comprise a solution of through-bores 2 in which one portion of the bore will be orthogonal to one of the faces and the other will be oblique, so as to accommodate, for instance, an elbow.

Another important characteristic regarding the through-bores 2 is that, preferably, but not compulsorily, they should be provided with an inner diameter that substantially matches the outer diameter of the tubes that were designed. This is because the tubing support 1 should be capable of supporting tubes 15 in a stable position with respect to its own body. In other words, this similarity in diameters should be capable of causing a slight constriction on the tubes 15, which is capable of keeping them slidingly fixed to the tubing support 1. As will be seen later, such an effect is also a result of the density of the material/foam of the tubing support 1 of the present invention.

Moreover, the through-bores 2, if any, should preferably comprise a material called fill foam 4 (see FIGS. 4 and 6), the function of which is to prevent pieces of gravel and concrete from penetrating the through-bores 2 during the step of concreting the slab, also serving to prevent the tubing support 1 from collapsing internally, reducing the inner diameter of its through-bores 2 during the concreting step, due to the pressure exerted by the liquefied concrete onto the side faces 3 of the tubing support 1. In other words, the use of a solid piece facilitates not only the storage, but also the arrangement of the piece on the slab before concreting. A possible embodiment of a tubing support 1 can be achieved by means of a massive block that is cut to form the through-bores 2, keeping the fill material 4 on the tubing support 1. In this way, the tubing support 1 and the through-bore 2 are of the same material.

It should be noted that, after curing process of the slab concrete has finished, the fill foams 4, if any, should be removed from the tubing support 1, in order to provide space for accommodating the tubes 15. In this regard, when it is provided with fill foams 4, the process of applying the tubing support 1 comprises the following steps:

Step 1: fixing the tubing support 1 at the desired place;
Step 2: concreting the slab;
Step 3: removing the fill foams 4 from inside the through-bores 2 (by previously cutting or cutting in this step);
Step 4: positioning the tubes 15 inside the through-bores 2.

As disclosed, the tubing support 1 may be built from synthetic foam, among the various other possible materials. This synthetic foam is preferably expanded polyethylene (EPE) foam of low density, or equivalent, provided with a density ranging from 15 Kg/m3 to 40 Kg/m3.

It is known that expanded-polyethylene foam is capable of imparting a number of qualities to the tubing support 1. Among these qualities are: lightweight, flexibility in application, capability of absorbing shocks, high heat and sound insulation capability, water-tightness, high resistance to corrosion by chemical substances and decomposition by organic agents.

Each application will have a compromise regarding the ideal density of the tubing support 1, with a view to achieve a balance between the properties of elasticity, flexibility, harness, etc. It should be noted ted a very high density will enable an irreversible plastic deformation during application of the tubing support 1. On the other hand, a very high density may easily lead to fracture of the material. Anyway, other materials or densities might be conceived for the tubing support 1, without this altering the inventive concept of this invention.

Other materials that could be employed in building the tubing support 1 are: rubber, latex, polystyrene, polypropylene, polyurethane rubbers or PVC, besides other flexible and non-foamy materials. Additionally, it is valid to point out that these materials may be applied in building the tubing support 1 and the fill foams 4.

It should be noted that the tubing support 1 may still be composed of a mixture of materials or overlapping layers of different materials. The tubing support 1 could comprise, for instance, an insulating layer 9 arranged on the second face 8 of the tubing support 1, which is configured to insulate the tubing support 1 from, for instance, flames and high temperatures caused by fire. This configuration may be useful to enable the use of the tubing support 1 in accommodating electric tubing, which requires greater protection against fire caused by accidental short-circuits, also in view of the legislation in force (see FIG. 10).

Figure 11:
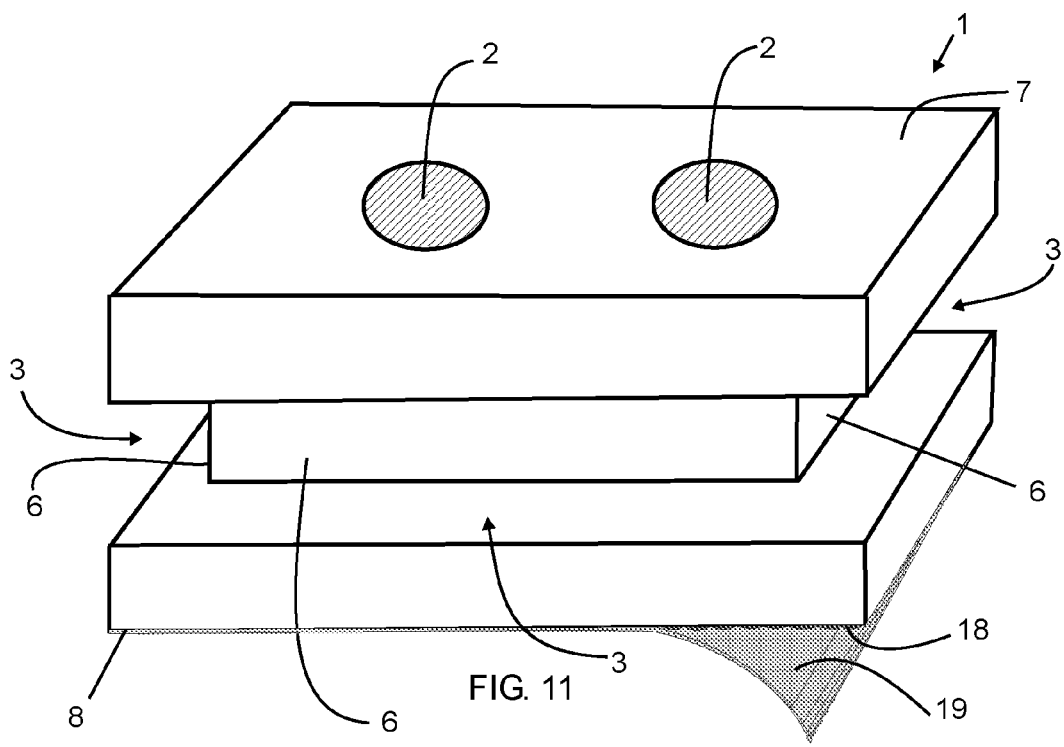
FIG. 11 is a perspective top view of a fifth exemplary embodiment of the present invention.

Another additional layer/film that may be added to the tubing support 1 is an adhesive layer 18 arranged on the second face of the tubing support 1 and covered with a plastic film 19 (see FIG. 11). This adhesive layer might be useful in fixing the tubing support 1 onto the wooden slab-mold, before the concreting step. When making use of this alternative configuration, a user of the tubing support 1 should remove the plastic film 19 from the tubing support 1, exposing the adhesive layer 18, the function of which is to enable fixation of the tubing support 1 onto the floor of the slab mold easily. Fixation of the tubing support 1 in the step that comes before the slab concreting may also be carried out by fixation with wires, threads, etc., between the support material and the adjacent ironware.

In another configuration presented in this specification, the tubing support 1 may be configured especially for accommodating water drainage tubing associated to a drain.

It should be noted that such particular tubing is more difficult to handle and work than vertical hydraulic tubing that extend along slabs of a building linearly (that is, the tubing represented in FIG. 9). The drainage tubing associated to drains (not shown in the figures) does not exhibit a standardized positioning as the latter does and, as such, the through-bore 2 of the tubing support 1 should not be pre-cut, under pain of not remaining arranged in the correct position.

This drainage tubing can be positioned at different places, according to the specific hydraulic planning of each bathroom or kitchen, for example. Another reason for which this drainage tubing exhibits variation in its positioning at different floors of a building is that this tubing exhibits higher dimensional tolerance with respect to its positioning, because it is arranged on a final branch of the hydraulic system.

Figure 12:
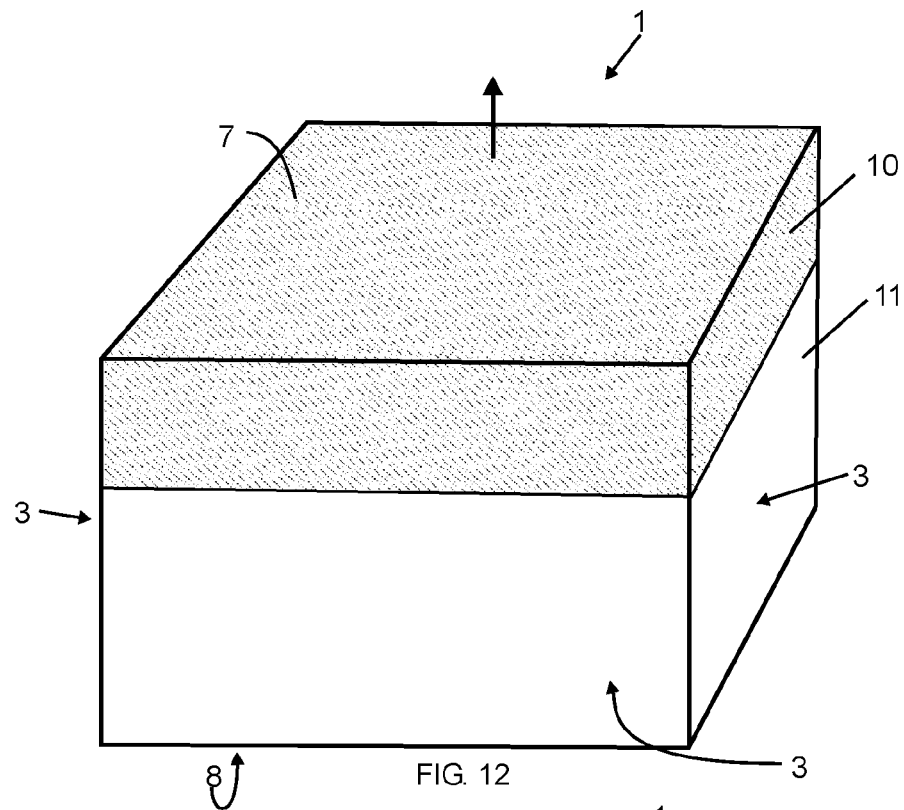
FIG. 12 is a perspective top view of a sixth exemplary embodiment of the present invention.
Figure 13:
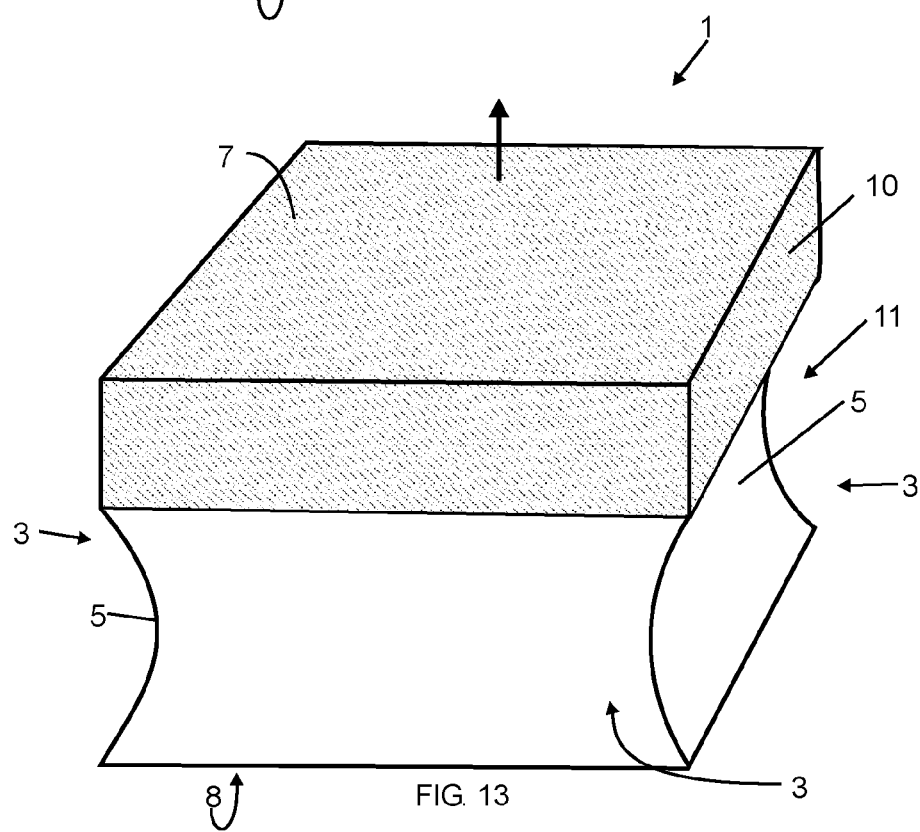
FIG. 13 is a perspective top view of a seventh exemplary embodiment of the present invention.

In order to meet the specific needs of this drainage tubing, the present invention has a constructive alternative that comprises at least two overlapping layers 10, 11 and, in its original form (that is, before it is applied to a slab), it does not comprise a through-bore 2, as the embodiments described before do (see FIGS. 12 and 13).

The reason for which this alternative embodiment of the tubing support 1 does not comprise "originally" a through-bore 2 is that this bore should be formed after the process of concreting the slab.

Thus, the reason for which this alternative embodiment comprises two overlapping layers results from the fact that the two layers constitute a removable layer 10 and a permanent layer 11. After the process of installing the tubing support 1 on the slab, that is, after the cure of the concrete, the removable layer 10 is discarded, a perforation is made in the permanent layer 11 for accommodating the tube 15 that will connect the drain and, after passage of the tube 15, a concrete layer if poured up to the slab level, that is, with a height substantially equivalent to that of the removable layer 10. The function of the concrete is to provide a stable association of the tube 15.

The process of employing this tubing support 1 for drainage tubing comprises the following steps:
Step 1: fixing the tubing support 1 at the desired place;
Step 2: concreting the slab;
Step 3: removing the removable layer 10;
Step 4: perforating a bore in the permanent layer 11;
Step 5: positioning the tube 15 in the bore made in step 4;
Step 6: applying an additional concrete layer onto the permanent layer 11 up to the slab height.

It should be noted that the anchorage is optional in this tubing support 1. Anyway, it is possible that the permanent layer 11 (only the permanent layer) comprises anchorage points, such as the concave profiles 5 arranged on the side faces 3 of the tubing support 1 shown in FIG. 13.

Figure 15:
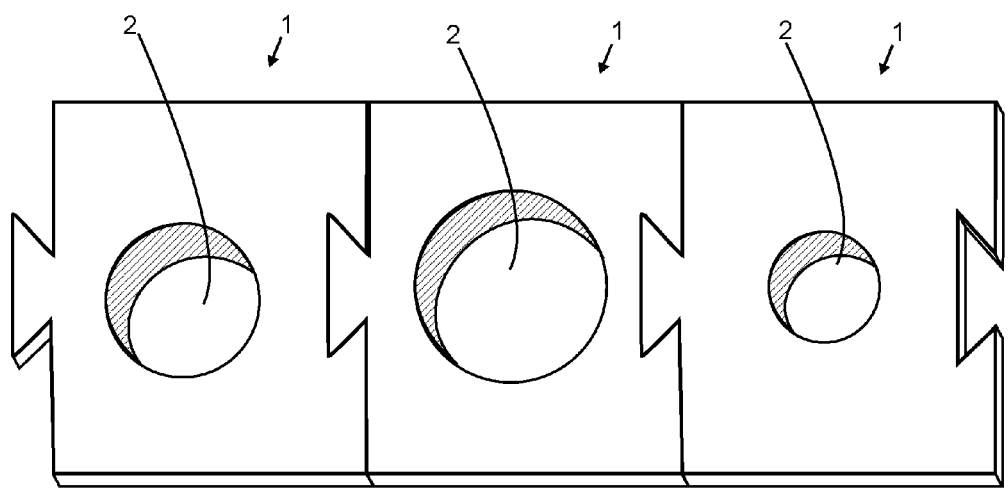
FIG. 15 is a perspective top view of the assembly formed by joining a number of tubing supports associated to each other.

Yet another embodiment described in this specification refers to a tubing-support-1 modular assembly, shown in FIG. 15.

Figure 14:
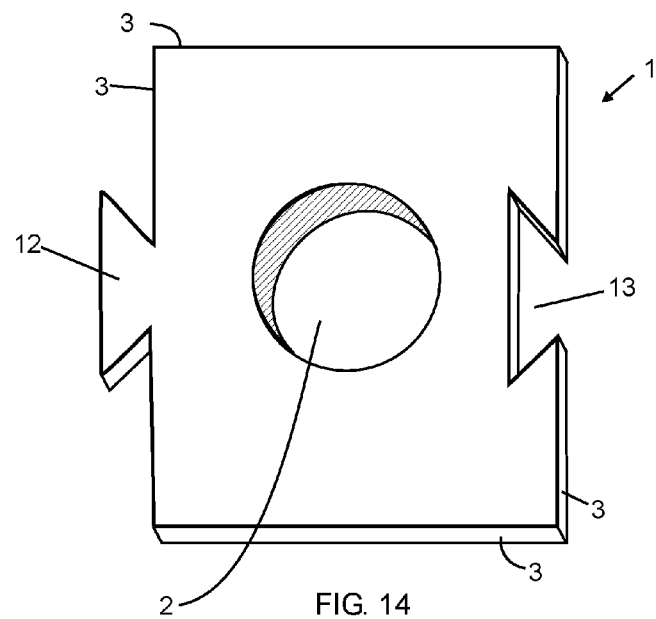
FIG. 14 is a perspective top view of an eighth exemplary embodiment of the present invention.

This modular assembly may be formed by joining two or more tubing supports 1 through association between a first association element 12 and a second association element 13 arranged, at least in part, at the side faces 3 of the tubing supports 1. These association elements 12, 13 may comprise, for instance, a protrusion corresponding to a recess located on another tubing support 1 (see FIG. 14).

However, the great purpose of these assemblies is that of enabling that one will meet the needs of any design with only a few parts. In other words, each tubing support 1 would have only a through-bore 2, and might be associated (in a fixed manner or not) to another tubing support).

The great difference lies in the fact that the tubing support 1 of FIGS. 2, 3, 4, 5, 6 arrives at the building site already with the through-bores 2 pre-determined according to the design, requiring a production intended for that construction. Alternatively, each tubing support 1 of the modular assembly will have only one through-bore 2, with various options of diameter. Thus, with few options of through-bore 2, one manages to meet numberless designs, the correct arrangement of each tubing support 1 that composes the module being left up to the assembling step. Such a product would have as the main focus, for instance, the final consumer, and might be sold at a specialized store, so that the stock of a few parts would generate combinations that would meet any and all needs.

Finally, a few alternative embodiments of this invention having been described, it should be noted that any combination among the above-described characteristics is possible. In this regard, it should be noted that it is feasible to conceive, for instance, a tubing-support-1 modular assembly, provides with an anchorage constituted by concave profiles 5, arranged only at the side faces 3, which do not comprise association elements 12, 13 and/or are provides with an adhesive layer 18.

Another alternative embodiment of the present invention is achieved by means of a tubing support 1 made of PVC, which makes use of the same principle used by the preferred embodiment of this invention, in order to achieve the same results of the tubing support 1 described before, providing a simple installation of access to hydraulic tubing and electric wire tubing in buildings.

It should be noted, from FIG. 16 on, that the PVC tubing support 1 consists of a hollow structure, preferably a cubic one, which comprises on its first upper face 7 a cover 28 and, on its second lower face 8, a lower detachable bore 25. At the sides, the PVC tubing support 1 may comprise one or more detachable side bores 21 and an anchoring recess 27. Naturally, the tubing support 1 of this embodiment can be achieved with PVC material or any other polymeric material that is suitable to the application.

Figure 20:
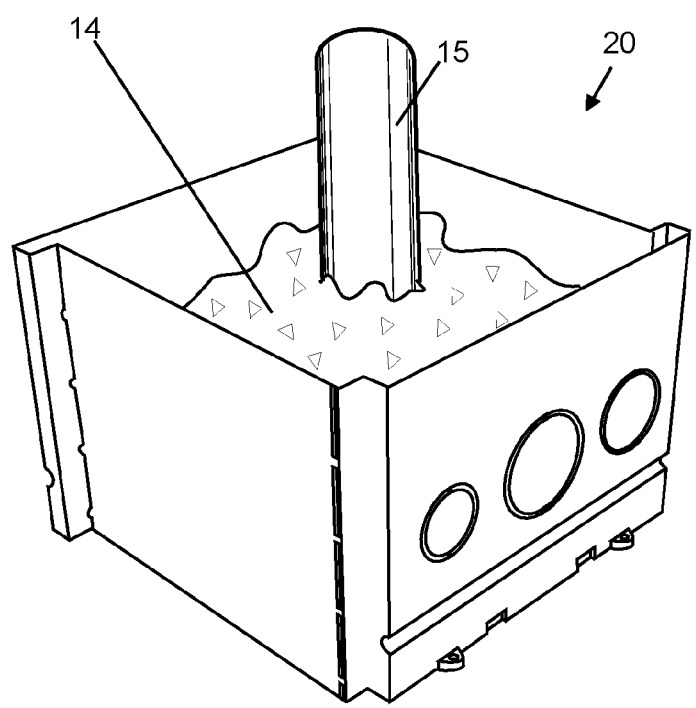
FIG. 20 is a top view of the present invention in a ninth exemplary embodiment called PVC shaft during the application phase.

Like the embodiment of the tubing support 1 of FIGS. 1 to 15, in this alternative embodiment, the tubing support 1 should be initially positioned at the slab anchorage place and, after the steps of pouring and curing the concrete 14, the tubing support 1 will remain fixed to the slab structure, providing access to one or more tubes 15 (see FIG. 20). This connection can orient the tubes both vertically and horizontally.

Figure 19:
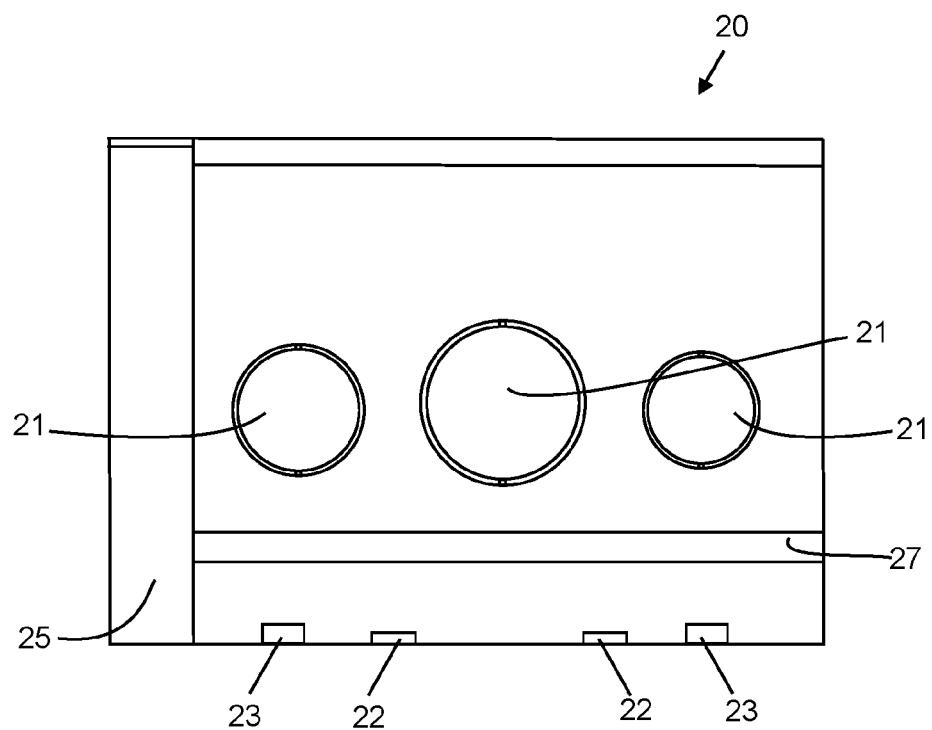
FIG. 19 is a side view of the present invention in the alternative PVC shaft embodiment.

On this tubing support 1 the element responsible for anchoring this structure to the slab after cure of the concrete 14 is the anchorage recess 27. Although FIGS. 16 and 19 show a linear recess, horizontally arranged on the outer side face of the tubing support 1, this anchoring recess 27 might exhibit different shapes and arrangements (including, instead of a recess, this structure might exhibit the physical form of a protrusion). The recess may also be designed to accommodate an iron that will aid in anchoring the tubing support 1 onto the concreted slab.

It should be noted that, during the slab concreting step, when the concrete 14 is poured onto the slab mold, the detachable side bores 21 and the lower detachable bore 24 may be perfectly sealed by means of a thin PVC sheet that is provisionally secured to the structure of the tubing support 1 by two or more support points. After pouring the slab, the detachable bores 21, 24 are opened and the cover 28 is removed from the structure of the tubing support 1. It is noted that the detachable bores 21, 24 may have any necessary diameter.

Then, the tubes 15 are inserted into the desired places and, right after insertion of the tubes 15, one pours a second portion of concrete 14 into the central cavity of the tubing support 1. This second portion of concrete 14 has the function of holding the tubes 15 fixed with respect to the structure of the tubing support 1. Additionally, the detachable bores 21, 24 may receive an elastic element, such as a circular rubber, so as to enable tight fitting between the tubes 15 and the tubing support 1.

Optionally, the tubing support 1 may comprise elements arranged on its side faces, which will enable modular association thereof with other PVC tubing supports 1 arranged adjacently.

The elements may consist, for instance, of snap-fit locks of the male 23 and female 22 type; vertical recesses 25 analogously arranged with respect to vertical protrusions 26; or still other elements of side association, arranged in any of the faces of the PVC tubing support 1. It should still be noted that the male-type locks 23 may be provided with a boring that enables them to receive, for instance, a nail for securing the tubing support 1 to the wood frame.

Turning now to FIG. 21, illustrated therein is another exemplary embodiment of a tubing support 100 according to the present invention. Analogous to tubing support 1 described elsewhere herein, the tubing support 100 was developed for being used during the concreting step or masonry step of a divider (see FIGS. 23 and 24A-24C, element 300) (by a "divider" one means any elements used for dividing rooms, and other environments in a building, such as walls and slabs). In this regard, one should understand that the tubing support 100 can be applied in accommodating any type of tubing, as for instance, hydraulic columns, toilet-bowl tubing, drain, to mention only a few applications. During the construction of a slab, for instance, the tubing support 100 should be fixed to the mold or to the iron bars 16 before the step of pouring the slab, that is, the step that consists in pouring liquefied concrete onto the mold (see FIG. 8).

After the concrete has cured, the tubing support 100—which has thickness similar to that of the slab where it should be applied—remains at the place where it was initially fixed, since its anchorage points keeps it associated to the slab concrete. For the example the tubing support 100 may have a thickness in its entirety of 20-24 centimeters. Of course, the thickness may be greater than 24 or less than 20 centimeters, however, as may be desirable, provided the thickness corresponds to a height or thickness of a corresponding concrete slab in which the tubing support 100 is used. Non-limiting and exemplary heights for concrete slabs may be eight inches (approximately 20 centimeters) and nine inches (approximately 23 centimeters).

Figure 22:
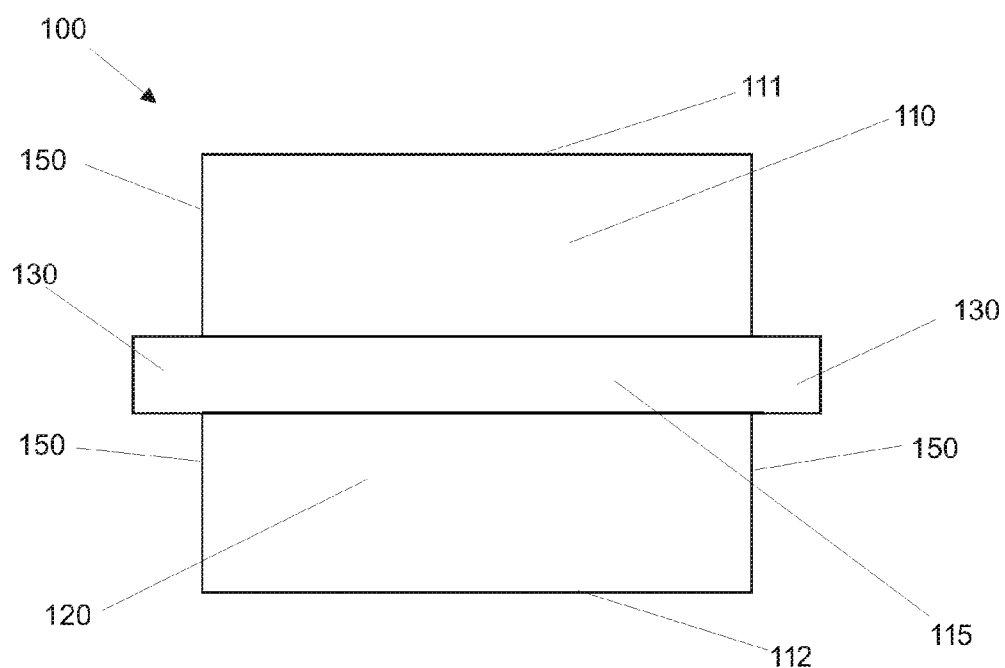
FIG. 22 is a side view of the embodiment of FIG. 21.
Figure 23:
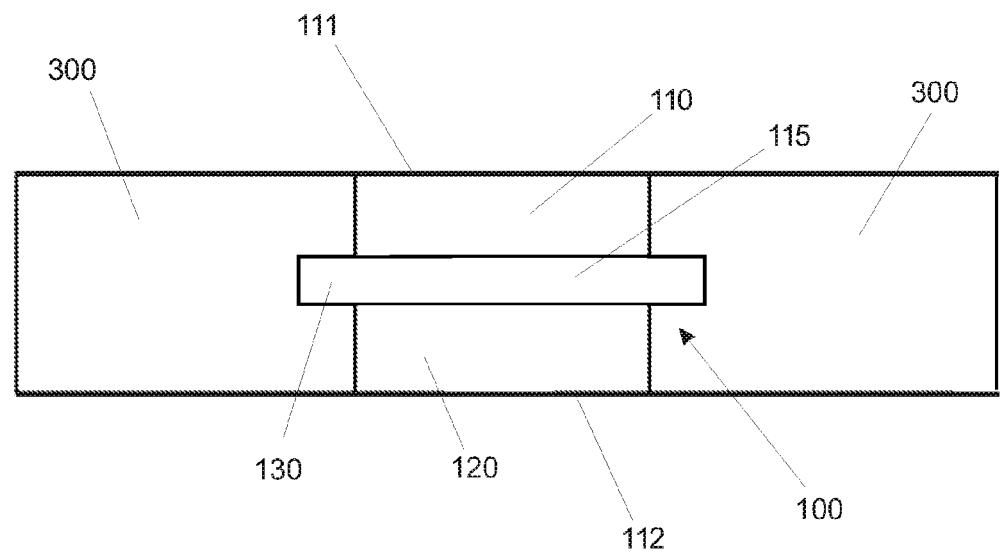
FIG. 23 is a front view of the tenth exemplary embodiment of FIG. 21, under application onto a concrete divider 300.

With continued reference to FIGS. 21-22, it may be understood therefrom, that the tubing support 100 may comprise, according to various embodiments: first and second removable layers 110, 120; a permanent layer 115 and at least two anchorage projections 130 positioned as at least a portion of the permanent layer. The first removable layer includes a top surface 111, which given the thickness of the tubing support 100 should correspond to a top surface of an associated concrete slab or divider 300 (see FIG. 23). The second removable layer includes a bottom surface 112, which given the thickness of the tubing support 100 should correspond to a base/floor of an associated concrete slab or divider 300 (see FIG. 23).

With reference to FIGS. 21-22 in conjunction to one another, it may be understood that in at least the illustrated embodiment, the projections 130 are confined to two opposing side surfaces 150 of the tubing support 100. The remaining two opposing side surfaces 150 of the tubing support do not contain any projections, which facilitates a modular configuration (i.e., at least two tubing supports positioned side by side, as illustrated in FIG. 25, so as to form a continuous row, with the lateral projections 130 forming a continuous surface that will be fixed in the concrete.

With continued reference in combination to FIGS. 21-22 and 25, it should be understood that the tubing support 100 may be provided in an individual embodiments or as a modular solution including a plurality (i.e., two or more) tubing supports. Given the construction of the tubing supports 100, wherein at least two opposing sides have no lateral projections formed thereupon, the tubing supports may be abutted relative to one another, so as to form not only a continuous line of the supports 100, but also a continuous surface of the lateral projections 130. The tubing support 100 may, in this regard, have any of a variety of poliedric shapes (as described elsewhere herein with reference to tubing support 1), provided the faces of the lateral projections 130 are planar relative to one another, for placement thereof easily side-by-side. Relative to the placement of the tubing support 100 adjacent a divider 300 (see FIG. 23), the lateral projections 130 should also be configured so as to extend from the side surfaces 150 at a 90 degree orientation relative thereto.

The lateral projections 130 may have squared (see FIG. 21), rounded, or otherwise-shaped profiles, as may be desirable. The otherwise-shaped profiles need only provide the requisite stability to the tubing support 100 after concreting. In this regard, it is noted that in an alternative configuration, for example, using a rounded tubing support, the lateral projections may be present around all four sides 150 of the tubing support so as to provided additional stability, noting however that such a configuration would not permit modular construction.

The lateral projections 130 may have any length. For example, their length (i.e., the distance which the projections extend outwardly beyond the side surface(s) 150 of the tubing support 100 may be between 15 and 90 millimeters. In another embodiment, the projections 130 may extend a distance ranging from 25 to 35 millimeters. In still another embodiment, the projections 130 may extend approximately 30 millimeters. The height of the lateral projections 130 may also vary, ranging from between 15 to 45 millimeters, in one embodiment having a height of approximately 30 millimeters. The height of the lateral projections 130 should be less than a height of the permanent layer 115, which heights as have been described elsewhere herein (by analogy to permanent layer 3 of FIGS. 12-13).

Considering, as a non-limiting example, application of the tubing support 100 with a concrete slab having a height of approximately 20 centimeters (eight inches), the first and second removable layers would have heights of approximately 85 millimeters each, with the lateral projections having a height of approximately 30 millimeters. Of course, the heights of the first and second removable layers need not be the same in certain embodiments. Likewise, the distance that the lateral projection 130 extends relative to the side surfaces 150 of the permanent layer 115 of the tubing support 100 need not be the same for all provided lateral projections upon a single tubing support. For example, lateral projections 130 on one side may extend to a greater degree than lateral projections provided on another, for example, opposing side. Still further, it should be understood that the heights/thicknesses of the various layers of the tubing support 100 may be otherwise configured for use with slabs of heights other than 20 centimeters (or 8 inches), for instance a still further non-limiting example of a nine inch slab (approximately 23 centimeters).

The tubing support 100 may further have a density of material (see materials described elsewhere herein with respect, by analogy, to tubing support 1) that ranges from 15 Kg/m3 to 40 Kg/m3. A non-limiting and exemplary material may be synthetic foam, which may preferably be an expanded polyethylene (EPE) foam of low density, or equivalent. It is known that expanded-polyethylene foam is capable of imparting a number of qualities to the tubing support 100. Among these qualities are: lightweight, flexibility in application, capability of absorbing shocks, high heat and sound insulation capability, water-tightness, high resistance to corrosion by chemical substances and decomposition by organic agents.

Each application will have a compromise regarding the ideal density of the tubing support 100, with a view to achieve a balance between the properties of elasticity, flexibility, harness, etc. It should be noted ted a very high density will enable an irreversible plastic deformation during application of the tubing support 100. On the other hand, a very high density may easily lead to fracture of the material. Anyway, other materials or densities might be conceived for the tubing support 100, without this altering the inventive concept of this invention.

Other materials that could be employed in building the tubing support 100 are: rubber, latex, polystyrene, polypropylene, polyurethane rubbers or PVC, besides other flexible and non-foamy materials. Additionally, it is valid to point out that these materials may be applied in building the tubing support 100 and the fill foams.

It should be noted that the tubing support 100 may still be composed of a mixture of materials or overlapping layers of different materials. The tubing support 100 could comprise, for instance, an insulating layer (not illustrated), which may be configured to retard flames and high temperatures caused by fire. This configuration may be useful to enable the use of the tubing support 100 in accommodating electric tubing, which requires greater protection against fire caused by accidental short-circuits, also in view of the legislation in force (see, by analogy, FIG. 10).

Another additional layer/film that may be added to the tubing support 100 is an adhesive layer (see, by analogy, FIG. 11). This adhesive layer might be useful in fixing the tubing support 100 onto the wooden slab-mold, before the concreting step. When making use of this alternative configuration, a user of the tubing support 100 should remove the plastic film from the tubing support 100, exposing the adhesive layer, the function of which is to enable fixation of the tubing support 100 onto the floor of the slab mold easily. Fixation of the tubing support 100 in the step that comes before the slab concreting may also be carried out by fixation with wires, threads, etc., between the support material and the adjacent ironware.

In these and various other embodiments presented in this specification, the tubing support 100 may be configured especially for accommodating water drainage tubing associated to a drain. It should be noted that such particular tubing is more difficult to handle and work than vertical hydraulic tubing that extend along slabs of a building linearly (that is, for example, the tubing support 1 represented in FIG. 9). The drainage tubing associated to drains (not shown in the figures) does not exhibit a standardized positioning as the latter does and, as such, no through-bore (see through-bore 2 of the tubing support 1) should be pre-cut, under pain of not remaining arranged in the correct position.

This drainage tubing 100 can be positioned at different places, according to the specific hydraulic planning of each bathroom or kitchen, for example. Another reason for which this drainage tubing exhibits variation in its positioning at different floors of a building is that this tubing exhibits higher dimensional tolerance with respect to its positioning, because it is arranged on a final branch of the hydraulic system.

Figure 10:
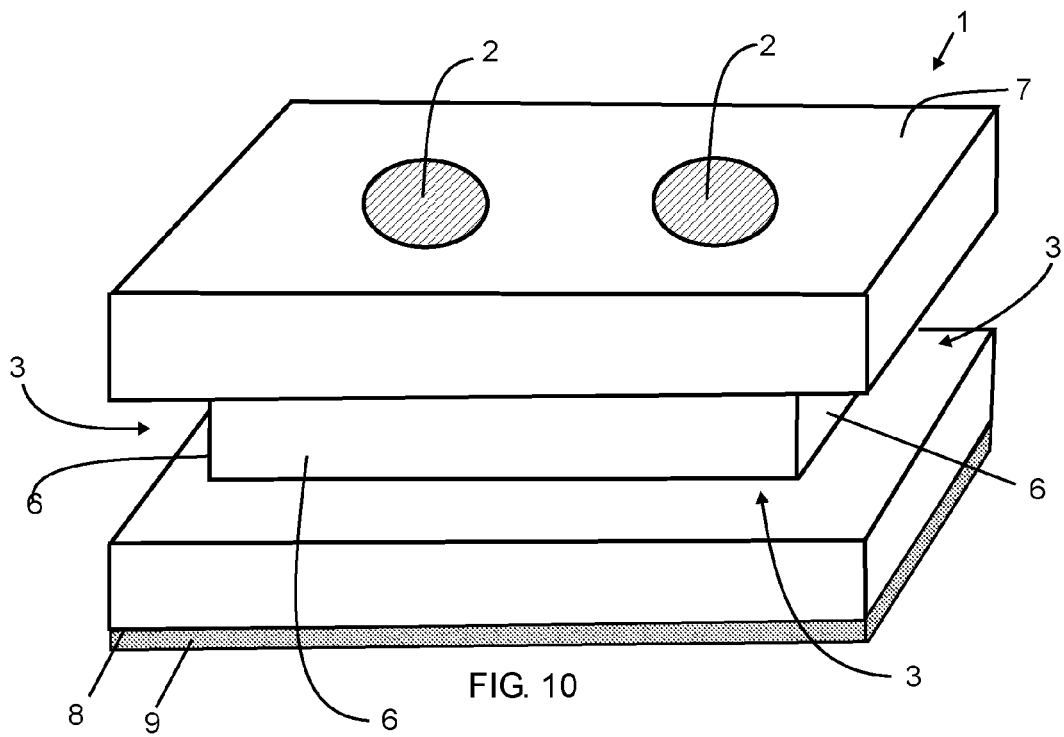
FIG. 10 is a perspective top view of a fourth exemplary embodiment of the present invention.

In order to meet the specific needs of this drainage tubing 100, the present invention incorporates a construction thereof that comprises at least two overlapping layers 110 and 115 and, in its original form (that is, before it is applied to a slab), it does not comprise a through-bore 140 (see FIG. 24A, as some of the embodiments described elsewhere herein do (see e.g., FIGS. 10-11). In certain embodiments, the drainage support tubing 100 comprises three overlapping layers 110, 115, and 120, wherein as compared to the embodiment above (including one removable layer 110 and one permanent layer 115), such includes two removable layers 110, 120 and one permanent layer 115 sandwiched there-between.

The reason for which this alternative embodiment of the tubing support 1 does not comprise "originally" a through-bore 140 is that this bore should be formed after the process of concreting the slab. Thus, the reason for which this alternative embodiment comprises two (or three) overlapping layers results from the fact that the layers constitute one or two removable layers 110 (and/or 120) and a permanent layer 115.

Thus, after the process of installing the tubing or drainage support 100 on the slab, that is, after the cure of the concrete, the removable layer 110 may be discarded, a perforation may be made in the permanent layer 115 for accommodating the tube 200 (see FIG. 24B) that will connect the drain and, after passage of the tube 200, a concrete layer if poured up to the slab level, that is, with a height substantially equivalent to that of the removable layer 110. The function of the concrete is to provide a stable association of the tube 200.

The process of employing this tubing support 100 for drainage tubing comprises the following steps:
Step 1: fixing the tubing support 100 at the desired place;
Step 2: concreting the slab;
Step 3: removing the removable layer 110;
Step 4: perforating a bore in the permanent layer 115 (FIG. 24A)
Step 5: positioning the tube 200 in the bore made in step 4 (FIG. 24B);
Step 6: applying an additional concrete layer onto the permanent layer 115 up to the slab height (FIG. 24C).

In certain embodiments, it should be noted that the above-outlined "Step 4" may be performed prior to "Step 3," such that the perforation exists prior to removing of the removable layer. The positioning of the tube in the bore made upon removing the perforated material—see Step 5—would then follow "Step 3."

Still further, it should be understood that in those embodiments having both removable layers 110, 120 for use in a drainage support particularly, the process of employing the same may be alternatively as follows:

Step 1: fixing the tubing support 100 at the desired place;
Step 2: concreting the slab;
Step 3: removing the removable layer(s) 110 and 120;
Step 4: perforating a bore in the permanent layer 115 (FIG. 24A)
Step 5: positioning the tube 200 in the bore made in step 4 (FIG. 24B);
Step 6: applying an additional concrete layer on top of and under (i.e., surrounding) the permanent layer 115 up to the slab height (FIG. 24C).

It is again noted that great difference lies in the fact that the tubing support 1 of FIGS. 2, 3, 4, 5, 6 arrives at the building site already with at least a length thereof pre-determined according to the design (i.e., so it fits within a pre-determined opening or to accommodate a specific number of tubes of a specific diameter), requiring a production intended for that construction. Alternatively, each tubing support 100 (whether individually in certain embodiments or as part of the modular assembly) may be constructed in any size and/or shape, as the modularity thereof may enable use of one or two (or even more) of the tubing supports 100, so as to satisfied a construction design. Still further, in certain embodiments, the tubing supports 100 may have no through-bores pre-cut therein, permitting later placement thereof based upon an implemented design. Such a product (i.e., with modularity of length) would have as the main focus, for instance, the final consumer, and might be sold at a specialized store, so that the stock of a few parts would generate combinations that would meet any and all needs.

Turning now again momentarily to FIG. 25, the modular solution for the tubing supports 100 is illustrated therein. When using such a modular construction, as alluded to previously herein, the tubing supports 100 are configured with lateral projections 130 on only certain (i.e., one or two) sides of the support 100. In this manner at least two "clean" faces (i.e., faces without lateral projections 130 formed thereon) are provided. The clean faces may thus be placed side by side, such that eventual weight and/or vertical pressure over the modular construction after concreting results in an equal pressure applied over the clean faces, which is absorbed by the lateral projections 130 in a similarly equal/distributed fashion. As a result, the modular system, as described, is configured to minimize the risk of any collapse thereof.

With reference now to FIGS. 26 and 27, still further exemplary embodiments of tubular supports 400, 500 are illustrated therein. Such may be understood largely by analogy to FIG. 21, with FIGS. 26 and 27 merely illustrating further exemplary tubing support shapes. Notably, the tubing support 400, with its circular profile and projections 430 extending around the entire perimeter thereof, would not be applicable for a modular solution, as described elsewhere herein; however the tubing support 500 would be so suited, if desirable. Notwithstanding the further exemplary shapes of tubing supports 400, 500 (circular in 400; tapered projection endings 530 in 500), such may be otherwise configured as is tubing support 100, by analogy. Thus, the permanent layers and removable layers 410, 420, 510, 520, and the associated faces/surfaces 411, 450, 511, 550 thereof may be configured in substantially the same manner as the layers 110, 120 and associated faces 111, 150 of tubing support 100, as described previously herein. Of course variations between tubing supports 400, 500 and tubing support 100 may exist in certain embodiments, further beyond the differences with respect to the lateral projections 430, 530, as detailed above, however as may be desirable for particular applications.

With reference now in totality to FIGS. 21-27, several exemplary and non-limiting advantages will be described. Notably, in certain embodiments with modular application, imprecisions or irregularities may arise when one or more recesses are provided instead of projections such as, for example, lateral projections 130. In some instances, such may be due to flaws in the construction of such recesses, or simply due to the difficulty of flowing concrete (or other materials) into a recess and fully filling the same. Where such occurs, imprecisions may result in unwanted movement of the tubing support positions—both among themselves (where modular) and in relation with dividers (where individual and where modular). In some instances, transferring and rotation of the tubing supports may occur, which problems are exacerbated in the context of a modular application, such that precise placement thereof within specific tolerance values becomes problematic. Incorporation of lateral projections thus provide an embedded part of the support, which can stick in the poured concrete in a manner that prevents any translation or rotation of the tubing support following pouring of the concrete. With such projections, impairments due to inefficiencies with concrete fill gaps in recesses, fixing, positioning, and/or sustaining of the tubing support position may be maximized. The embodiments of FIGS. 21-27 thus address and solve at least this identifiable problem, namely by eliminating any recesses; incorporating instead only projections, namely lateral in construction, so as to avoid any gaps or imprecisions during concrete pouring.

Another non-limiting advantage present in FIGS. 21-27 is the provision of two removable layers 110, 120. Such enables a configuration where one or both of the layers may be removed, depending upon fire regulations for particular applications. For example, if foam material is to minimized, per a fire regulation, both layers may be removed, thus resulting in more concrete (and less foam) than if only one layer (e.g., 110) were removed prior to pouring of concrete. Various alternatives may be envisioned in this regard, as should be considered within the scope and nature of the present invention.

Yet another advantage of the various embodiments of FIGS. 21-27 lies in that no through-bore 140 is pre-cut prior to removal of at least layer 110 (and/or removal of layer 120). In this manner, placement of hole may be done on site, as desirable and positioning as appropriate. A resulting advantage of this is manufacturing of large volumes of the tubing supports 100 (or 1, 400, 500) as opposed to discrete manufacturing of different versions thereof with pre-cut bores formed therein. This is particular useful in modular applications, where bore holes may not be necessary in all aligned tubing supports 100 (see FIG. 25), but intermediate supports may be provided so as to ensure a continuous lateral projection for pouring of concrete.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A building tubing support comprising:
 a first removable layer having a first thickness, a first length, and a substantially flat first removable face lying in a first face plane and oriented in a first direction;
 a second removable layer having a second thickness, a second length, and a substantially flat second removable face lying in a second face plane and oriented in a second direction, the second length being the same as the first length, the second face plane being parallel and spaced apart from the first face plane, the second direction being oppositely oriented relative to the first direction;
 a permanent layer having a third thickness, a third length in at least a third direction, a fourth length in at least fourth direction, and opposing substantially flat first and second permanent faces lying in respective third and fourth face planes, said third length being greater than both the first and the second lengths, said fourth length being less than the third length, said fourth direction being perpendicular to said third direction, said third and fourth face planes being parallel and spaced apart relative to one another and the first and second planes, the permanent layer being positioned intermediate said first and second removable layers; and
 at least two opposing side surfaces, each of said at least two opposing side surfaces having a first portion defined by the first thickness of the first removable layer, a second portion defined by the second thickness of the second removable layer, and a third portion defined by the third thickness of the permanent layer, said third portion being positioned intermediate said first and second portions,
 wherein:
 the first, second, and third thicknesses of the removable and permanent layers collectively define a height of the tubing support, the height of the tubing support being substantially equivalent to a height of at least two faces of a divider between which the tubing support is positioned;
 said first and second portions of each of said at least two opposing side surfaces are oriented in respective side surface planes, each of said side surface planes being perpendicular to said first, second, third, and fourth face planes; and
 said third portion of each of said at least two opposing side surfaces is oriented in a respective lateral projection plane, said lateral projection plane being perpendicular to said first, second, third, and fourth face planes, said lateral projection plane being further spaced apart from and parallel to said side surface plane of said first and second portions of each of said at least two opposing side surfaces, such that said third portion of a first of said at least two opposing side surfaces defines a first lateral projection of said tubing support extending outwardly and perpendicularly from said first and said second portions of said first of said at least two opposing side surface, and such that said third portion of a second of said at least two opposing side surfaces defines a second lateral projection of said tubing support extending outwardly and perpendicularly from said first and second portions of said second of said at least two opposing side surfaces, wherein at least one discontinuity is provided between said first and said second lateral projections due to said fourth length of said permanent layer being less than said third length in at least said fourth direction.

2. The tubing support of claim 1, wherein:
 said at least two opposing side surfaces consists of a first set of two opposing side surfaces;
 said tubing support further comprises a second set of two opposing side surfaces, said second set of two opposing side surfaces being defined by said first, second, and third portions; and
 said first, second, and third portions of each of said second set of two opposing side surfaces are oriented in respective side surface planes, each of said respective side surface planes being perpendicular to said first, second, third, and fourth face planes, such that said third portion of said second set of two opposing side surfaces is coplanar with said first and second portions.

3. The tubing support of claim 1, wherein said at least two opposing side surfaces comprise two sets of two opposing side surfaces.

4. The tubing support of claim 1, wherein the third length of the permanent layer is between 15 and 90 millimeters.

5. The tubing support of claim 1, wherein the third length of the permanent layer is between 25 and 35 millimeters.

6. The tubing support of claim 1, wherein the third length of the permanent layer is approximately 30 millimeters.

7. The tubing support of claim 1, wherein the third thickness of the permanent layer is between 15 and 45 millimeters.

8. The tubing support of claim 1, wherein the third thickness of the permanent layer is between 25 and 35 millimeters.

9. The tubing support of claim 1, wherein the third thickness of the permanent layer is approximately 30 millimeters.

10. The tubing support of claim 1, wherein:
 the first thickness of the first removable layer is approximately 85 millimeters;
 the second thickness of the second removable layer is approximately 85 millimeters; and
 the third thickness of the permanent layer is approximately 30 millimeters.

11. The tubing support of claim 1, wherein said tubing support is configured to accommodate hydraulic tubing.

12. The tubing support of claim 1, wherein said tubing support comprises low-density expanded polyethylene form having density ranging from 15 to 40 Kg/m3.

13. The tubing support of claim 1, wherein the first and second removable layers are made from a first material and the permanent layer is made from a second material, the second material being different than the first material.

14. A method of applying a tubing support onto a slab, said method comprising the steps of
 positioning the tubing support at a desired location, the tubing support comprising:

(i) a first removable layer having a first thickness, a first length, and a substantially flat first removable face lying in a first face plane and oriented in a first direction;
(ii) a second removable layer having a second thickness, a second length, and a substantially flat second removable face lying in a second face plane and oriented in a second direction, the second length being the same as the first length, the second face plane being parallel and spaced apart from the first face plane, the second direction being oppositely oriented relative to the first direction;
(iii) a permanent layer having a third thickness, a third length, and opposing substantially flat first and second permanent faces lying in respective third and fourth face planes, said third length being greater than both the first and the second lengths, said third and fourth face planes being parallel and spaced apart relative to one another and the first and second planes, the permanent layer being positioned intermediate said first and second removable layers; and
(iv) at least two opposing side surfaces, each of said at least two opposing side surfaces having a first portion defined by the first thickness of the first removable layer, a second portion defined by the second thickness of the second removable layer, and a third portion defined by the third thickness of the permanent layer, said third portion being positioned intermediate said first and second portions,
(v) wherein the first, second, and third thicknesses of the removable and permanent layers collectively define a height of the tubing support, the height of the tubing support being substantially equivalent to a height of at least two faces of a divider between which the tubing support is positioned; said first and second portions of each of said at least two opposing side surfaces are oriented in respective side surface planes, each of said side surface planes being perpendicular to said first, second, third, and fourth face planes; and said third portion of each of said at least two opposing side surfaces is oriented in a respective lateral projection plane, said lateral projection plane being perpendicular to said first, second, third, and fourth face planes, said lateral projection plane being further spaced apart from and parallel to said side surface plane of said first and second portions of each of said at least two opposing side surfaces, such that said third portion of each of said at least two opposing side surfaces defines a lateral projection of said tubing support extending outwardly and perpendicularly from said first and second portions of said at least two opposing side surfaces;
applying an initial concrete layer around the tubing support, the initial concrete layer forming the slab such that a substantially flat surface of the slab is parallel and aligned with the substantially flat first face of the tubing support;
removing at least the first removable layer from the tubing support;
after removing at least the first removable layer, perforating at least the permanent layer so as to form a through-bore therein, the through-bore being formed perpendicular relative to and passing through a portion of the substantially flat second permanent face of the permanent layer;
positioning at least one tube in the formed through-bore; and
applying an additional concrete layer at least on top of the permanent layer and around the at least one tube so as to fix the at least one tube in a stable position, the additional concrete layer having a thickness such that a substantially flat surface of the additional concrete layer aligns with the substantially flat surface of the slab.

15. The method of claim 14, wherein:
said step of removing at least the first removable layer from the tubing support comprises removing both the first and the second removable layers from the tubing support;
said step of perforating at least the permanent layer consists of perforating only the permanent layer; and
said step of applying an additional concrete layer at least on top of the permanent layer further comprises applying the additional concrete layer below said lateral projections.

16. The method of claim 14, wherein said step of perforating at least the permanent layer comprises perforation of both the permanent layer and the second removable layer.

17. The method of claim 16, wherein the step of perforating at least the permanent layer occurs after the step of removing at least the first removable layer.

18. The method of claim 17, wherein:
the method further comprises the step of removing a portion of the permanent layer and the second removable layer adjacent the perforation so as to form the through-bore; and the step of removing the portion of the permanent layer occurs after the step of perforating the permanent layer and before the step of positioning the at least one tube in the through-bore.

19. The method of claim 14, wherein said step of perforating at least the permanent layer comprises perforation of only the permanent layer.

20. The method of claim 19, wherein the step of perforating only the permanent layer occurs after the step of removing both the first and second removable layers.

21. The method of claim 20, wherein:
the method further comprises the step of removing a portion of the permanent layer adjacent the perforation so as to form the through-bore; and
the step of removing the portion of the permanent layer occurs after the step of perforating the permanent layer and before the step of positioning the at least one tube in the through-bore.

22. The method of claim 14, wherein, for said provided tubing support:
said at least two opposing side surfaces consists of a first set of two opposing side surfaces;
said tubing support further comprises a second set of two opposing side surfaces, said second set of two opposing side surfaces being defined by said first, second, and third portions; and
said first, second, and third portions of each of said second set of two opposing side surfaces are oriented in respective side surface planes, each of said respective side surface planes being perpendicular to said first, second, third, and fourth face planes, such that said third portion of said second set of two opposing side surfaces is coplanar with said first and second portions.

23. A modular assembly comprising:
two or more tubing supports, each tubing support comprising:

(i) a first removable layer having a first thickness, a first length, and a substantially flat first removable face lying in a first face plane and oriented in a first direction;
(ii) a second removable layer having a second thickness, a second length, and a substantially flat second removable face lying in a second face plane and oriented in a second direction, the second length being the same as the first length, the second face plane being parallel and spaced apart from the first face plane, the second direction being oppositely oriented relative to the first direction;
(iii) a permanent layer having a third thickness, a third length in at least a third direction, a fourth length in at least fourth direction, and opposing substantially flat first and second permanent faces lying in respective third and fourth face planes, said third length being greater than both the first and the second lengths, said fourth length being less than the third length, said fourth direction being perpendicular to said third direction, said third and fourth face planes being parallel and spaced apart relative to one another and the first and second planes, the permanent layer being positioned intermediate said first and second removable layers; and
(iv) at least two opposing side surfaces, each of said two opposing side surfaces having a first portion defined by the first thickness of the first removable layer, a second portion defined by the second thickness of the second removable layer, and a third portion defined by the third thickness of the permanent layer, said third portion being positioned intermediate said first and second portions, wherein the first, second, and third thicknesses of the removable and permanent layers collectively define a height of the tubing support, the height of the tubing support being substantially equivalent to a height of at least two faces of a divider between which the tubing support is positioned; said first and second portions of each of said two opposing side surfaces are oriented in respective side surface planes, each of said side surface planes being perpendicular to said first, second, third, and fourth face planes; and said third portion of each of said two opposing side surfaces is oriented in a respective lateral projection plane, said lateral projection plane being perpendicular to said first, second, third, and fourth face planes, said lateral projection plane being further spaced apart from and parallel to said side surface plane of said first and second portions of each of said two opposing side surfaces, such that said third portion of each of said two opposing side surfaces define respective first and second lateral projections of said tubing support, each of said first and second lateral projections extending outwardly and perpendicularly from said first and second portions of said at least two opposing side surfaces;

wherein:

said at least two opposing side surfaces consists of a first set of two opposing side surfaces;

said tubing support further comprises a second set of two opposing side surfaces, said second set of two opposing side surfaces being defined by said first, second, and third portions;

said first, second, and third portions of each of said second set of two opposing side surfaces are oriented in respective side surface planes, each of said respective side surface planes being perpendicular to said first, second, third, and fourth face planes, such that said third portion of said second set of two opposing side surfaces is coplanar with said first and second portions and defines at least one discontinuity between said first and said second lateral projections extending outwardly and perpendicularly from said first set of two opposing side surfaces; and said modular assembly is formed by positioning respective ones of said two or more tubing supports adjacent one another, such that said second set of two opposing side surfaces of each of the two or more tubing supports are in direct contact with one another, such that said first and second lateral projections defined by said third portion of said first set of opposing side surfaces of each of said two or more tubing supports create relative to each other a continuous linear surface for embedding within poured concrete in a manner that stabilizes from tubing support against any movement thereof.

24. A building tubing support comprising:

a removable layer having a first thickness and a substantially flat first face oriented in a first direction;

a permanent layer having a second thickness and a substantially flat second face oriented in a second direction, the permanent layer being positioned adjacent the removable layer and formed from a different material different than the removable layer, the second direction being opposite the first direction; and at least one side surface having first and second segments, each of said first and second segments of said at least one side surface having a first portion being defined by the first thickness of the removable layer and a second portion being defined by the second thickness of the permanent layer;

wherein:

the first portion of each of the first and second segments of the at least one side surface has a planar profile;

the second portion of the first segment of the at least one side surface has a planar profile;

the second portion of the second segment of the at least one side surface has a non-planar profile, such that at least one discontinuity is defined between the respective second portions of said first and second segments of the at least one side surface;

the first and the second portions of the second segment of the at least one side surface are configured to together correspond with at least two faces of a divider between which the tubing support is positioned; and the first and second thicknesses of the removable and permanent layers together define a height of the tubing support, the height of the tubing support being substantially equivalent to a height of the divider.

25. The tubing support of claim 24, wherein the tubing support has at least one of a polyhedral or rounded-body geometric form, said form being defined at least in part by the height of the tubing support.

* * * * *